(12) United States Patent
Long et al.

(10) Patent No.: US 12,156,853 B2
(45) Date of Patent: *Dec. 3, 2024

(54) SMART PILL DISPENSER

(71) Applicant: Express Scripts Strategic Development, Inc., St. Louis, MO (US)

(72) Inventors: Andrew Long, Austin, TX (US); Stanley Joe Johnson, Tarrytown, NY (US); Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,225

(22) Filed: Dec. 11, 2023

(65) Prior Publication Data
US 2024/0108552 A1    Apr. 4, 2024

Related U.S. Application Data

(62) Division of application No. 17/492,754, filed on Oct. 4, 2021, now Pat. No. 11,857,505.
(Continued)

(51) Int. Cl.
*A61J 7/00* (2006.01)
*A61J 1/03* (2023.01)
(Continued)

(52) U.S. Cl.
CPC ............. *A61J 7/0084* (2013.01); *A61J 1/03* (2013.01); *A61J 7/0076* (2013.01); *A61J 7/02* (2013.01);
(Continued)

(58) Field of Classification Search
CPC .... A61J 7/0084; A61J 1/03; A61J 7/02; A61J 7/0076; A61J 2200/30; B65G 1/1371; B65G 1/045

See application file for complete search history.

(56) References Cited

U.S. PATENT DOCUMENTS

| 3,991,908 A | 11/1976 | Thomas |
| 4,150,766 A | 4/1979 | Westendorf |

(Continued)

FOREIGN PATENT DOCUMENTS

| EP | 3469503 A2 | 4/2019 |
| GB | 2122578 B | 10/1985 |
| WO | 2018031724 A1 | 2/2018 |

OTHER PUBLICATIONS

Havens, Debra Hardy, and Lizbet Boroughs. ""To err is human": a report from the Institute of Medicine." Journal of pediatric health care 14.2 (2000): 77-80.; http://www.nap.edu/catalog/9728.html.

(Continued)

*Primary Examiner* — Michael Collins
(74) *Attorney, Agent, or Firm* — Dickinson Wright PLLC

(57) ABSTRACT

The medication dispensing assembly includes a housing having an interior. A medication bottle is disposed in the interior with its cap assembly facing vertically downwardly. The cap assembly includes outer, middle, and inner pieces. The outer and inner pieces are fixed with one another, and the middle piece is fixed with the bottle. A drive unit is disposed in the interior of the housing and is configured to rotate the bottle and the middle piece of the cap assembly about a vertical axis. The three pieces of the cap assembly have respective medication openings, and rotating the bottle causes individual pills to travel first from the bottle into the inner piece, then into the middle piece, then around the vertical axis, and then outside of the cap assembly through the medication opening of the outer piece.

20 Claims, 21 Drawing Sheets

Related U.S. Application Data

(60) Provisional application No. 63/087,345, filed on Oct. 5, 2020.

(51) Int. Cl.
*A61J 7/02* (2006.01)
*B65G 1/04* (2006.01)
*B65G 1/137* (2006.01)

(52) U.S. Cl.
CPC .......... *B65G 1/045* (2013.01); *B65G 1/1371* (2013.01); *A61J 2200/30* (2013.01)

(56) References Cited

U.S. PATENT DOCUMENTS

| | | | |
|---|---|---|---|
| 5,014,877 A | 5/1991 | Roos | |
| 5,230,441 A | 7/1993 | Kaufman | |
| 5,582,323 A | 12/1996 | Kurtenbach | |
| 6,662,081 B1 | 12/2003 | Jacober | |
| 7,543,718 B2 | 6/2009 | Simon | |
| 7,584,849 B2 | 9/2009 | Mauk | |
| 7,896,195 B2 | 3/2011 | Limback | |
| 8,025,314 B2 | 9/2011 | Adler | |
| 9,033,193 B2 | 5/2015 | Dong | |
| 9,181,005 B2 | 11/2015 | Demarco | |
| 9,251,493 B2 | 2/2016 | Jacobs | |
| 9,498,408 B2 | 11/2016 | Craig | |
| 9,622,939 B2 | 4/2017 | Buxton-Dakides | |
| 9,724,463 B2 | 8/2017 | Wang | |
| 9,730,860 B2 | 8/2017 | Hamilton | |
| 10,022,305 B2 | 7/2018 | Bunker | |
| 10,238,579 B2 | 3/2019 | Zonana | |
| 10,457,472 B2 | 10/2019 | Sanders | |
| 10,479,588 B2 | 11/2019 | Sanders | |
| 11,554,081 B1 * | 1/2023 | Gellman | ................ G16H 10/65 |
| 11,857,505 B2 * | 1/2024 | Long | ................ A61J 7/0084 |
| 2004/0205343 A1 | 10/2004 | Forth | |
| 2008/0054007 A1 | 3/2008 | Mador | |
| 2008/0223807 A1 | 9/2008 | Botts | |
| 2010/0076595 A1 | 3/2010 | Nguyen | |
| 2010/0228566 A1 | 9/2010 | Taylor | |
| 2014/0358278 A1 | 12/2014 | Zhang | |
| 2015/0090733 A1 | 4/2015 | Park | |
| 2015/0283036 A1 | 10/2015 | Aggarwal | |
| 2016/0042150 A1 | 2/2016 | Moloughney | |
| 2016/0158107 A1 | 6/2016 | Dvorak | |
| 2016/0324727 A1 | 11/2016 | Waugh | |
| 2017/0000693 A1 | 1/2017 | Orr | |
| 2017/0129665 A1 | 5/2017 | Rolfes | |
| 2018/0147120 A1 | 5/2018 | Poirier | |
| 2019/0035499 A1 | 1/2019 | Daya | |
| 2019/0228852 A1 | 7/2019 | García | |
| 2019/0374436 A1 | 12/2019 | Townley | |
| 2023/0147994 A1 | 5/2023 | Mercolino | |

OTHER PUBLICATIONS

Tuga, Aurel O., and Maura J. McGuire. "Adherence and health care costs." Risk management and healthcare policy 7 (2014): 35. https://www.ncbi.nlm.nih.gov/pmc/articles/PMC3934668/.

NPR—Truven Health Analytics Health Poll, https://www.npr.org/tags/155872782/npr-truven-health-analytics-health-poll, as early as Feb. 2020.

TSA, Can You Pack Your Meds in a Pill Case; https://www.tsa.gov/travel/travel-tips/can-you-pack-your-meds-pill-case-and-more-questions-answered; as early as Feb. 2020.

Watanabe, Jonathan H., Terry McInnis, and Jan D. Hirsch. "Cost of prescription drug-related morbidity and mortality." Annals of Pharmacotherapy 52.9 (2018): 829-837., https://journals.sagepub.com/eprint/ic2iH2maTdl5zfN5iUay/full.

* cited by examiner

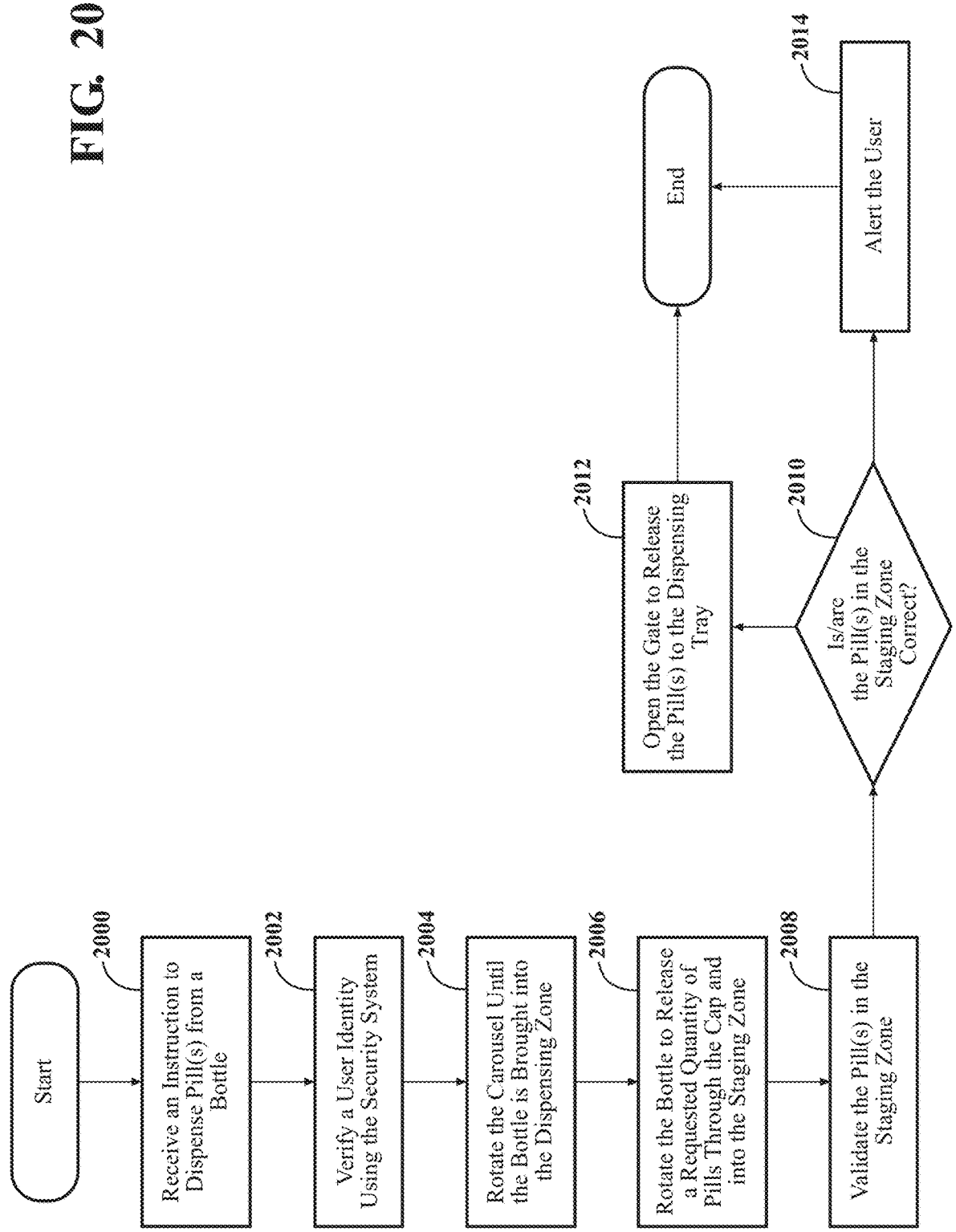

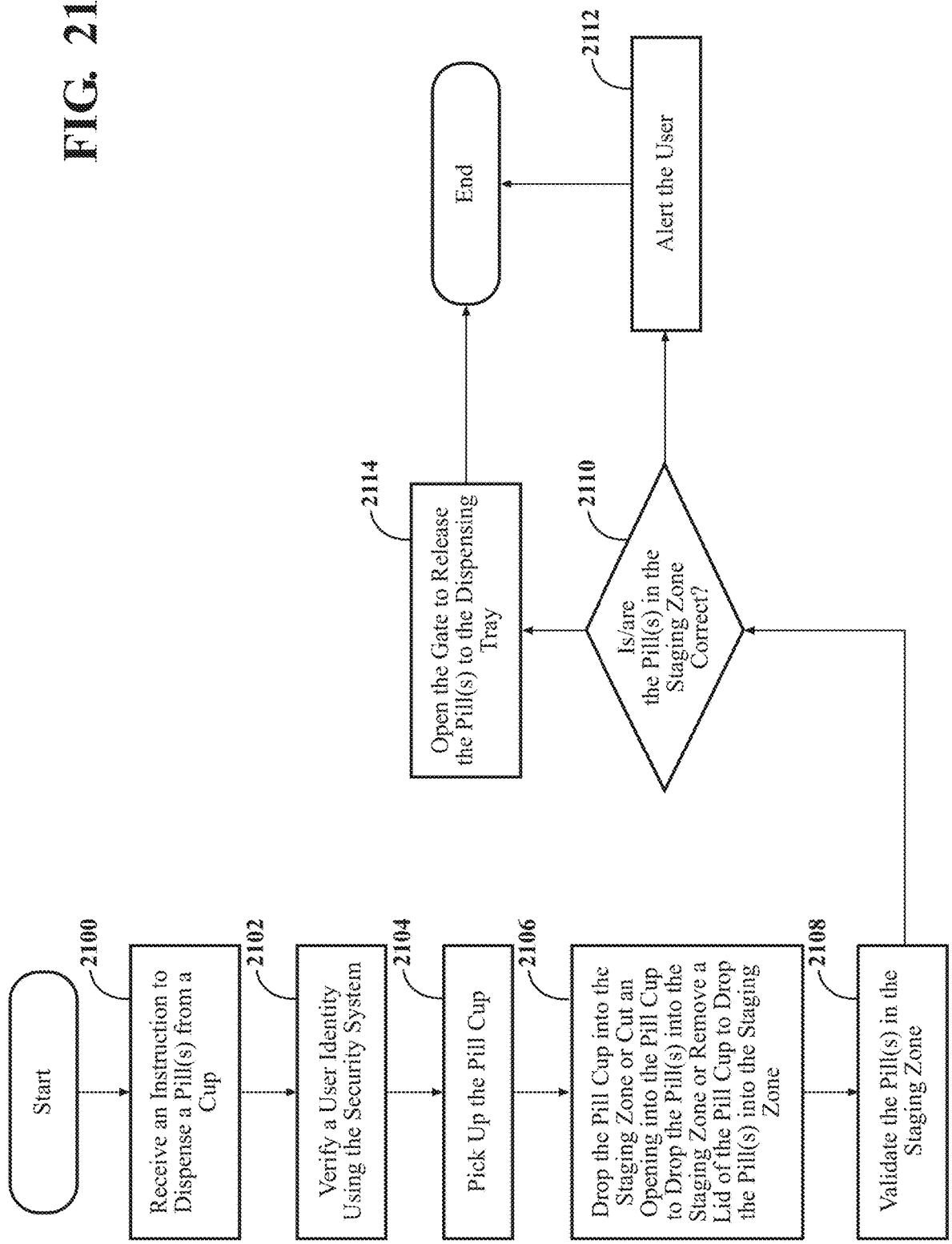

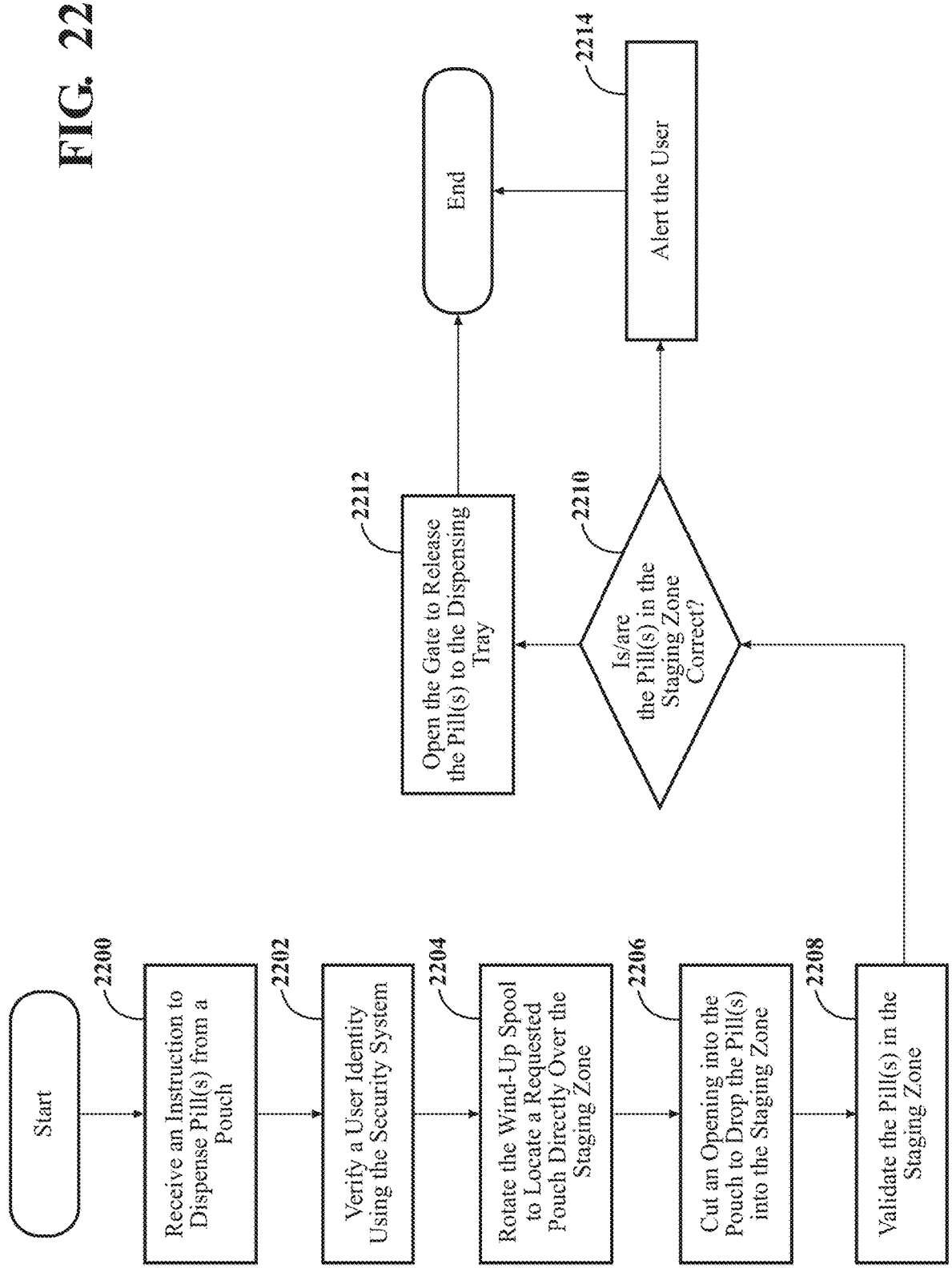

SMART PILL DISPENSER

CROSS-REFERENCE TO RELATED APPLICATION

This application is a divisional of U.S. application Ser. No. 17/492,754, which was filed Oct. 4, 2021. Said application Ser. No. 17/492,754 claims priority to U.S. Provisional Patent App. No. 63/087,345, filed on Oct. 5, 2020, and entitled "SMART PILL DISPENSER," the entire disclosures of which are hereby incorporated herein by reference.

BACKGROUND

1. Field

The present disclosure is related generally to a medication dispensing device which contains multiple different types of pills and can dispense those pills to a user.

2. Related Art

Many pharmaceutical regimens require a user to take multiple different types of medications at different times. Generally, greater the variation in the dosing events and/or the greater the number of different medications leads to diminished medication compliance. In other words, the more complicated a dosing regimen is, the less likely it will be correctly followed by the user. To counteract this problem, some products have been developed to improve medication compliance.

One known product which seeks to improve medication compliance is a pill container which includes a plurality of individual chambers which can contain different medications all in one container and which can be manually opened and closed. However, a few known problems with this product are that it is cumbersome to load and may not greatly improve compliance because the user may simply forget to take a dose. Another problem with this product is that in some jurisdictions, medications can only be transported in containers, which are labeled to identify what medications are contained therein. Such labels are not common in these known types of multi-chambered pill containers.

SUMMARY

An example embodiment of a medication dispensing assembly for dispensing medications from at least one medication bottle to a user is described. The medication dispensing assembly can include a housing having an interior; a medication bottle including a receptacle and a cap assembly and disposed in the interior with the cap assembly facing vertically downwardly; the cap assembly comprising at least three pieces including an outer piece and a middle piece and an inner piece, the outer and inner pieces being fixed with one another, the middle piece being fixed with the receptacle, and each of the outer and middle and inner pieces of the cap assembly having at least one medication opening; a drive unit disposed in the interior of the housing and configured to engage the receptacle of the medication bottle to rotate the receptacle and the middle piece of the cap assembly relative to the outer and inner pieces of the cap assembly and about an axis which extends through the medication bottle; and the at least one medication opening in the outer piece of the cap assembly being circumferentially offset from the at least one medication opening in the inner piece such that rotation of the receptacle and the middle piece causes individual pills to travel first from the receptacle into the at least one medication opening of the inner piece, then into the at least one medication opening of the middle piece, then around the axis, and then outside of the cap assembly through the at least one medication opening of the outer piece.

In an example embodiment, the medication dispensing assembly may further include a carousel disposed in the interior of the housing and having a plurality of openings and the cap assembly being received in one of the openings.

In an example embodiment, the axis of the medication dispensing assembly coaxial with the bottle axis or generally aligned with a bottle axis. A carousel can be positioned the interior of the housing and is rotatable about a carousel axis which is spaced from and parallel with the bottle axis to move the medication bottles through a plurality of zones within the interior of the housing.

In an example embodiment, the medication dispensing assembly further includes a plurality of medication bottles and a plurality of cap assemblies received in the plurality of openings of the carousel.

In an example embodiment, the medication dispensing assembly further has one of the zones being a dispensing zone.

In an example embodiment, the drive unit includes at least one drive wheel that is configured to engage with and rotate the receptacle to dispense the medication.

In an example embodiment, the one of the zones is an inspection zone with at least one sensor that is configured to analyze the medication bottle to automatically determine a contents of the medication bottle.

In an example embodiment, the medication dispensing assembly includes a staging zone positioned to receive medications dispensed from the at least one cap assembly.

In an example embodiment, the staging zone includes at least one sensor and at least one gate and wherein the gate is configured to only open to allow the medications in the staging zone to be dispensed out of the housing in response to a confirmation that the medications in the staging zone have been requested by a user.

In an example embodiment, the medication dispensing assembly includes a medication packaging including a plurality of pouches containing medications, the medication packaging extending over the staging zones, and a cutting device for opening the pouches to dispense the medications contained in the pouches into the staging zone.

In an example embodiment, the medication dispensing assembly further includes a plurality of pill cups disposed in the interior of the housing and containing medications; and a picking mechanism configured to engage individual ones of the pill cups and dispense the medications contained in the pill cups into the staging zone.

A method of dispensing a medication from a bottle in a medication dispensing device is described herein. The method can include the steps of inserting a bottle that has a receptacle and a cap assembly into the medication dispensing device such that the cap assembly faces downwardly, the cap assembly including an inner piece and a middle piece and an outer piece, the inner and outer pieces being fixed with one another, the middle piece being fixed with the receptacle, and each of the pieces of the cap assembly having at least one medication opening; and rotating the receptacle and the middle piece relative to the outer piece and the inner piece to channel a medication from the medication bottle sequentially through the at least one medication opening in the inner piece, then through the at least one medication opening in the middle piece, and then out of the cap assembly through the at least one medication opening in the outer piece.

In an example embodiment, the dispensing includes the outer piece is an outer cap and the middle piece is an inner cap that is received in the outer cap and wherein the inner piece is a disk that is received in the inner cap.

In an example embodiment, the dispensing includes the at least one medication opening in the disk is circumferentially offset from the medication opening in the outer cap such that the medication must travel in the at least one medication opening in the inner cap around a rotational axis before exiting the cap assembly through the at least one medication opening in the outer cap.

In an example embodiment, the dispensing further includes the step of receiving the medication dispensed out of the cap assembly into a staging zone of the medication dispensing device.

In an example embodiment, the method further includes the step of analyzing the medication in the staging zone and further including the step of dispensing the medication out of the staging zone only in response to a positive verification of the medication in the staging zone.

In an example embodiment, the dispensing includes the step of inserting the bottle into the medication dispensing device includes inserting the bottle into a carousel and further including the steps of: rotating the carousel to bring the bottle into an inspection zone; inspecting a contents of the bottle with at least one sensor; and rotating the carousel to bring the bottle into a dispensing zone prior to the step of rotating the receptacle and middle piece of the cap assembly A cap assembly for singulating and dispensing a medication from a bottle in a medication dispensing device is described and can include an outer piece; a middle piece that is at least partially received within the outer piece; an inner piece that is received in the middle piece, the inner piece being fixedly attached with the outer piece; the middle piece being rotatable relative to the outer and inner pieces about an axis; each of the outer piece and the middle piece and the inner piece having at least one medication opening sized to allow a medication pass therethrough; and the at least one medication opening in the inner piece being circumferentially spaced from the at least one medication opening of the outer piece such that the medication openings in the outer piece and the middle piece and the inner piece cannot be aligned with one another and such that rotation of the middle piece causes individual medications to travel first into the at least one medication opening in the inner piece then into the at least one medication opening in the middle piece, then around the axis and then outside of the cap assembly through the at least one opening in the outer piece.

In an example embodiment, the cap assembly includes the outer piece being an outer cap and the middle piece being an inner cap that is received in the outer cap and wherein the inner piece is a disk that is received in the inner cap.

In an example embodiment, the cap assembly includes one of the outer cap and the disk having a probe which extends through the inner cap and which is fixedly attached with the other of the outer cap and the disk.

In an example embodiment, the inner cap includes inner threads for threading into engagement with the bottle.

BRIEF DESCRIPTION OF THE DRAWINGS

These and other features and advantages of the disclosure will become more readily appreciated when considered in connection with the following description of the presently preferred embodiments, appended claims and accompanying drawings, in which:

FIG. 20 is a flow chart illustrating the steps of an exemplary method according to another aspect of the subject disclosure;

FIG. 21 is a flow chart illustrating the steps of an exemplary method according to yet another aspect of the subject disclosure; and FIG. 22 is a flow chart illustrating the steps of an exemplary method according to still another aspect of the subject disclosure.

DESCRIPTION OF THE ENABLING EMBODIMENT

Referring to the Figures, wherein like numerals indicate corresponding parts throughout the several views, one aspect of the present disclosure is related to a medication dispensing device 20 that is configured to automatically dispense one or more different types of solid medications for a user (e.g., a patient, a caregiver or the like). The dispensing device 20 is conveniently contained within a compact package, which can be stored in a convenient location within a user's home, such as on a kitchen counter, under a shelf, or on a bedside table. The medications are frequently hereinafter referred to as pills 22; however, it should be appreciated that other types of medications that can be singulated may be employed. Such medications may include, for example, solid medications (such as tablets, gel caps, capsules or the like, e.g., non-liquid medicines) or non-solid medications in containers (such as single use eye drop containers or other single use liquid medications).

As discussed in further detail below, in operation, the dispensing device 20 automatically singulates and dispenses pills 22 directly out of their respective original prescription containers either according to a preset schedule or an on-demand request by the user. This improves medication compliance by allowing the user to conveniently store a large supply of different pills 22 in their original medication containers a single, convenient device 20, which not only stores the pills 22 in a sorted manner but also assists the user with their medication schedule thereby preventing either missed doses or double doses. As also discussed in further detail below, the medication dispensing device 20 is a smart device in that it knows what types of medications are contained within it and the quantities of those medications and is able to communicate this and other information to a user's external device 24 (such as a smart phone, a tablet, a personal, computer, a smart watch, a dedicated unit, a voice assistant, a host, or any suitable type of electronic device) and is able to receive information from the external device 24. The various containers in the dispensing device 20 may contain a range of different types of pills 22 including both prescription and non-prescription medications. The dispensing device 20 may also communicate with other authorized devices, e.g., a caregiver device, a family member device and the like. This can work to notify the other authorized device of the dispensing of the pills from the device 20.

In an example embodiment, singulating refers to the ability to remove a single one of a pill from a container or reservoir in the device 20. The singulating action can be repeated to dispense more than one pill.

Figure 1:
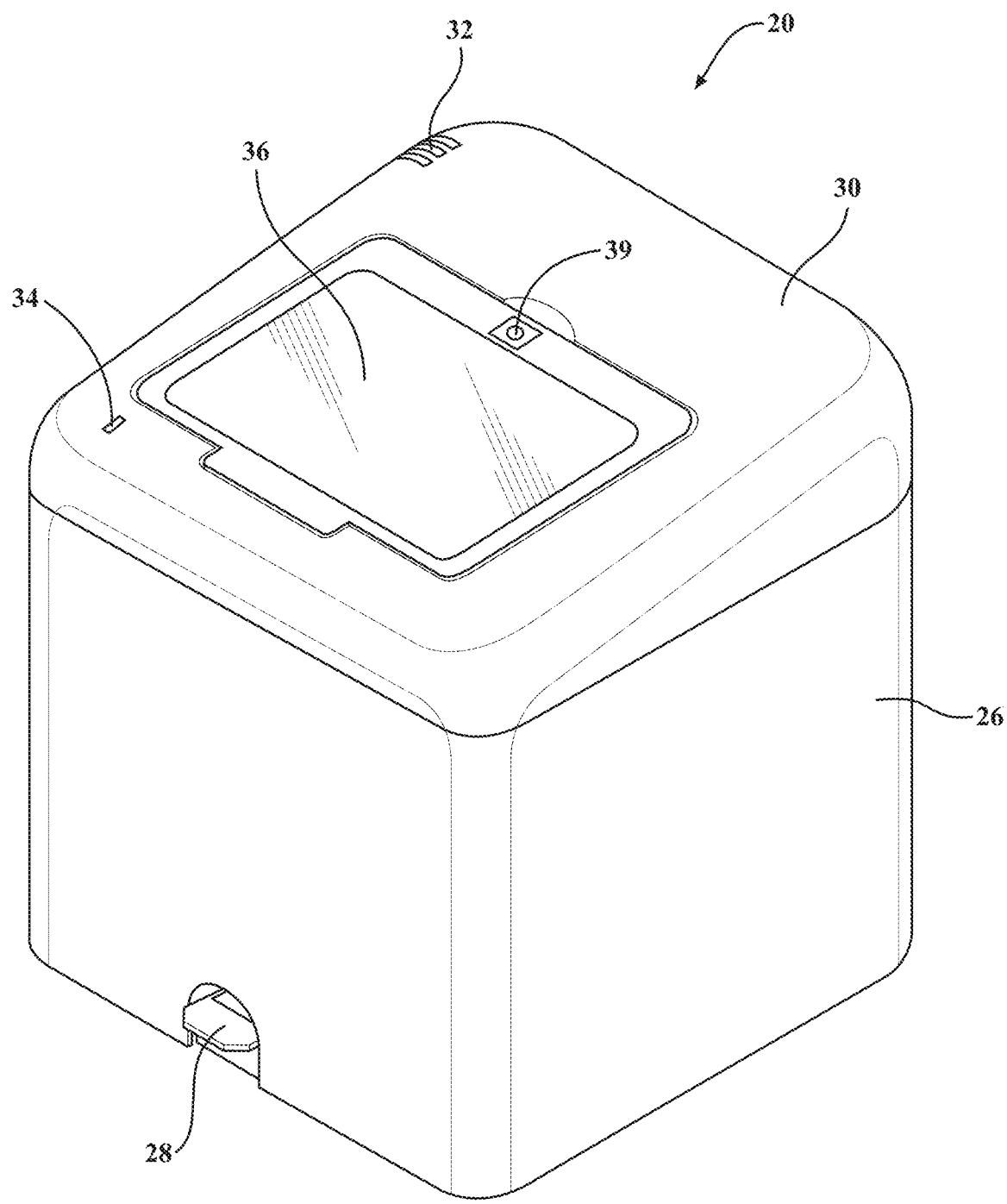
FIG. 1 is a perspective elevation view showing a first embodiment of a dispensing device with a lid of the dispensing device being in a closed position.
Figure 2:
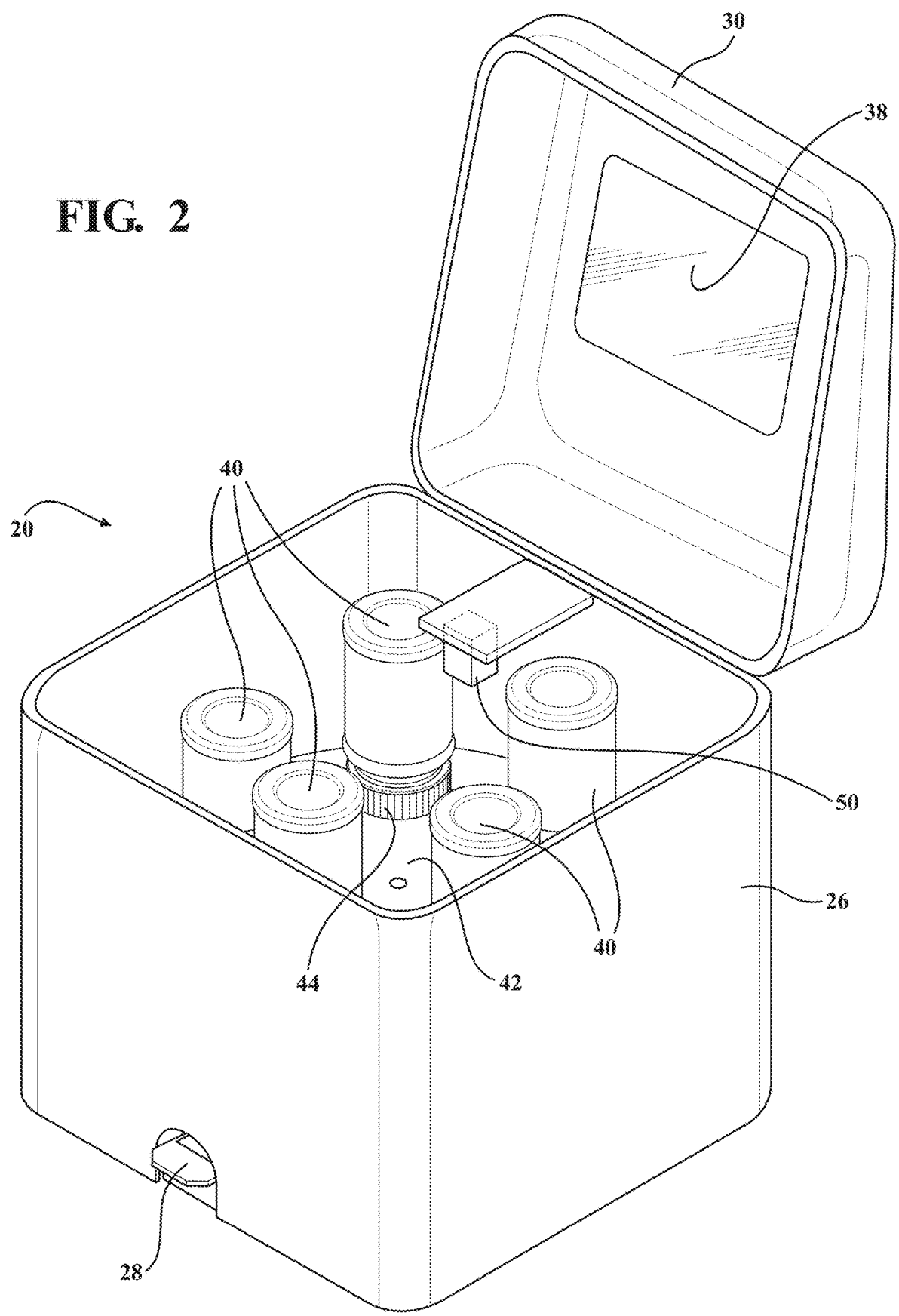
FIG. 2 is a perspective elevation view of the dispensing device of FIG. 1 and showing the lid in an open position.

Referring now to FIGS. 1 and 2, the dispensing device 20 includes a housing 26 with an open interior, which contains the medications containers, and a dispensing tray 28. A lid 30 is hingedly connected with the housing 26 and can be manually or automatically opened and closed. The housing 26 and lid 30 are sealed against one another to block all or substantially all outside light from entering the open interior, thereby controlling the environment within the open interior to improve verification of the medications contained within the dispensing device 20, as discussed in further detail below. The lid 30 is shown on the top of the housing but may also be positioned on the side or rear of the housing 26.

The lid 30 has a top surface that includes machine-to-human interaction devices or human machine interface (HMI), which may include a speaker 32, a microphone 34, and a first display screen 36. In some embodiments, the lid 30 also includes one or more buttons (not shown) which provide another means by which a user can communicate with the dispensing device 20. A second display screen 38 is attached with a lower surface (inner surface when lid is closed) of the lid 30 so that the user can also interact with the dispensing device 20 when the lid 30 has been opened. The first and second display screens 36, 38 may be, for example, liquid crystal display (LCD) or light emitting diode (LED) displays and preferably include touch screen interfaces. However, any suitably screen types may be employed. The lid may further include a camera 39 which may allow the user to conduct a videoconference appointment with a medical care provider through the dispensing device 20.

The speaker 32; the microphone 34; and the first and second display screens 36, 38 are a few ways (other ways discussed in further detail below) for a user to interact with the dispensing device 20. Such interactions may allow the user to, inter alia, check the quantities of the medications contained in the dispensing device 20, request a medication, adjust an automatic dispensing schedule, and/or pair the dispensing device 20 with an external device 24. When the dispensing device 20 determines that the medication count in any of the medication containers is below a predetermined threshold (e.g., five pills or a time period, such as a week or less, or two weeks or less of medication remains), an alert can be displayed on the first display screen 36 (if the lid 30 is closed) or the second display screen 38 (if the lid 30 is open), or the alert can be broadcast through the speaker 32. When the lid 30 is open, the second display screen 38 can show instructions on how to accomplish a task in the interior of the housing 26, e.g., how to properly insert or remove medication containers. In an example embodiment, the inner, second display screen 38 is off whenever the lid 30 is closed. This can be performed by a switch in the housing that is engaged to turn on the display 38 with the lid closed onto the remainder of the housing.

One type of medication container that the dispensing device 20 is able to hold and dispense is pills 22 from is a medication bottle 40. Specifically, the interior of the housing 26 contains a carousel 42 with a plurality of through openings that are shaped and sized to hold a plurality of bottles 40 in an upside-down orientation such that the caps 44 of the bottles 40 all face vertically downwardly. The carousel 42 is preferably configured such that proper insertion of the cap 44 into one of the through openings of the carousel 42 results in an audible "snapping" sound to provide the user with a positive affirmation that the insertion was successful. In an example embodiment, the device can include light curtains therein that sense when a medication bottle is inserted into the openings in the body of the carousel 42. The emitters and detectors of the light curtain can be mounted on the housing and direct a light beam (which includes infra-red emissions) toward the carousel. The caps 44 are held in the respective openings of the carousel 42 in a detachable manner such that any of the bottles 40 can be manually and individually removed from the dispensing device 20, e.g., when the medication in the bottle 40 is depleted. In the exemplary embodiment, the carousel contains five separate openings for holding five (5) different bottles 40, which could contain either the same types or different types of medications. In other embodiments, the housing contains more or fewer than five (5) openings.

During operation of the dispensing device 20, the carousel 42 rotates about a centrally located first axis to move the bottles 40 mounted thereon between different zones (including an inspection zone 46 and a dispensing zone 48) within the interior of the housing 26. The carousel 42 is preferably driven in rotation by an electric motor (not shown) which can rotate the carousel 42 about the first axis in either rotational direction (clockwise or counter-clockwise). In an example embodiment, the first axis is vertical and the carousel rotates in a horizontal plane or orthogonal to the first axis. Additional zones, such as a loading/unloading zone may also be included.

Figure 4:
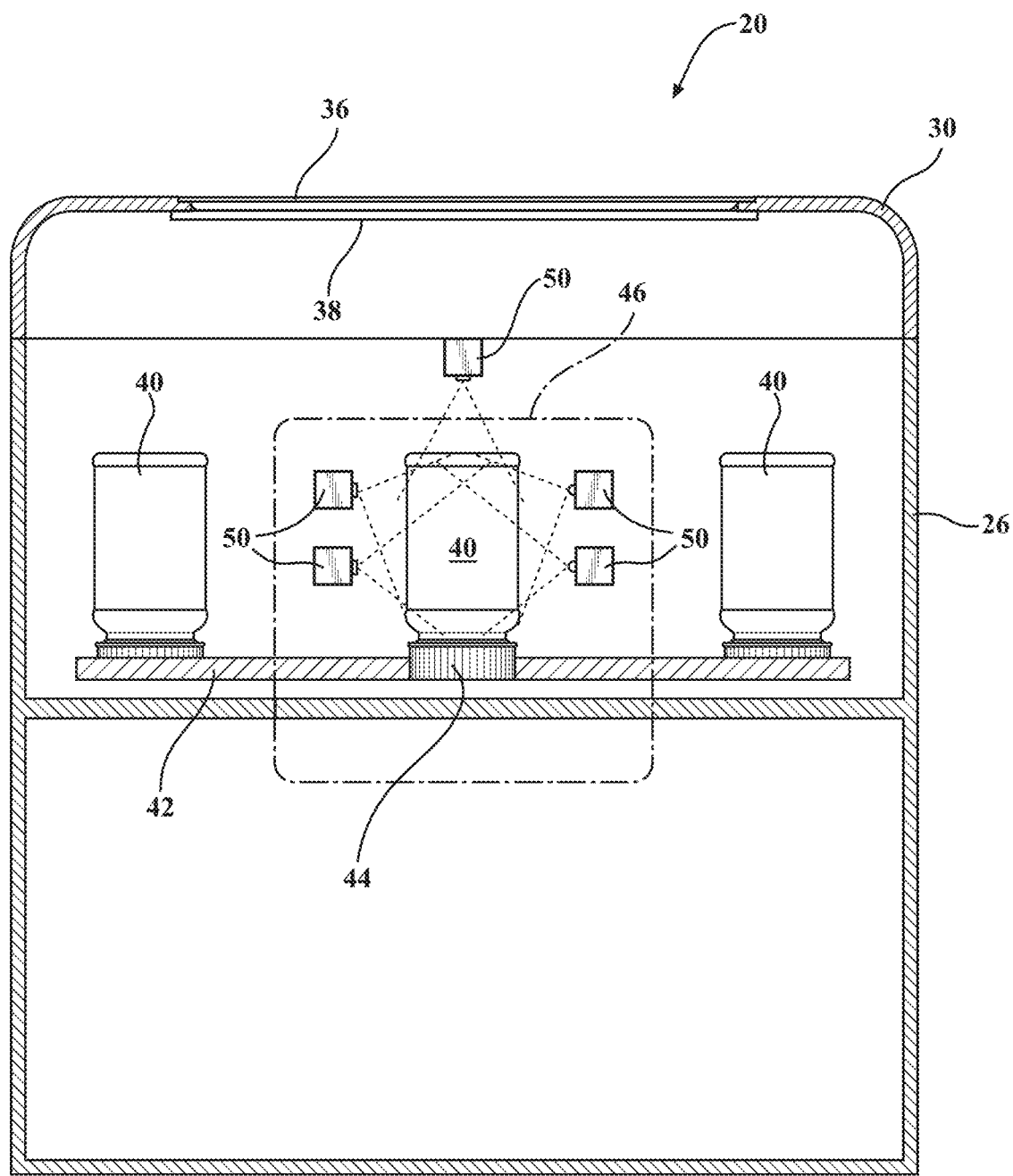
FIG. 4 is another cross-sectional front view of the dispensing device of FIG. 1.
Figure 5:
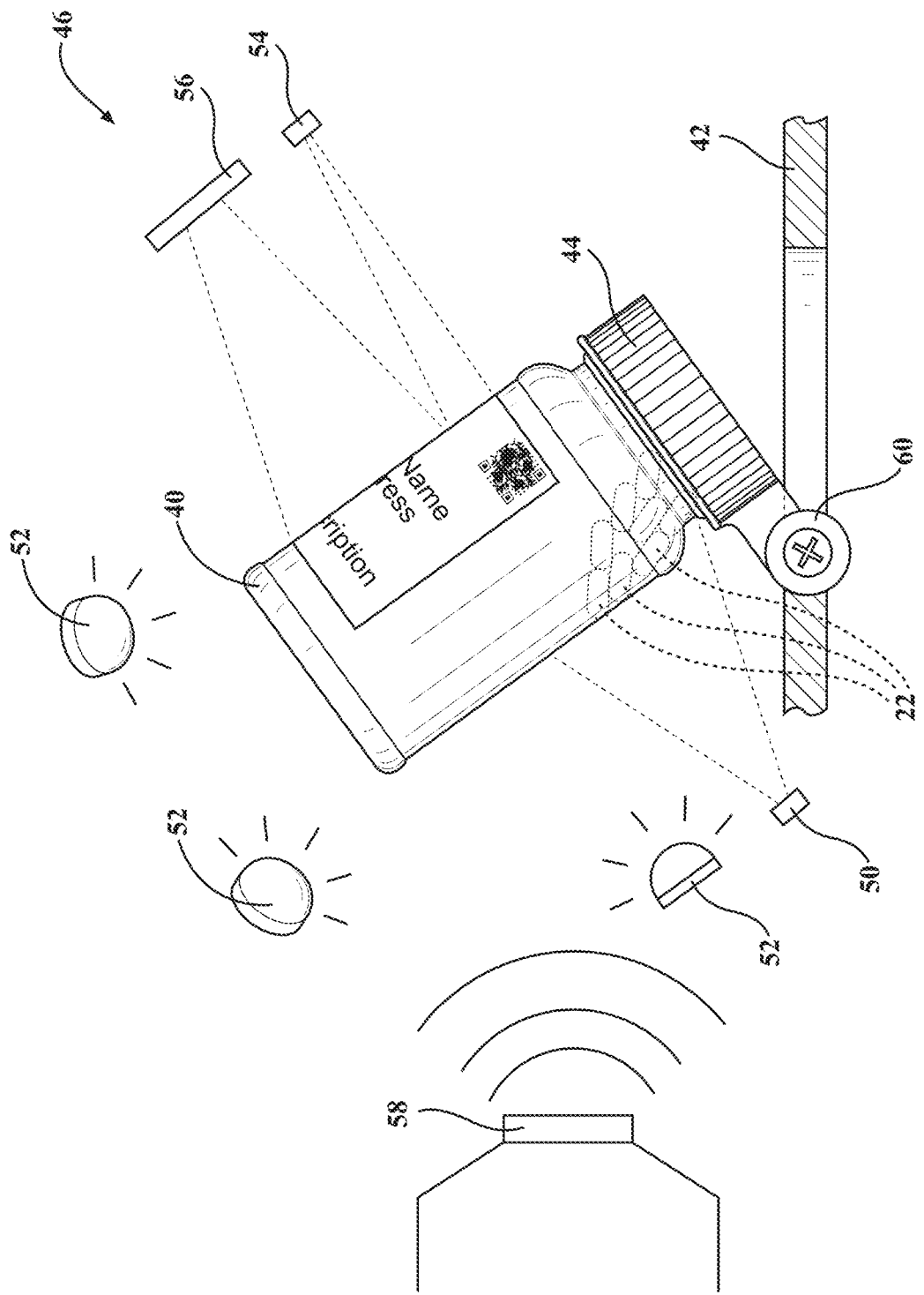
FIG. 5 is an enlarged view showing a dispensing zone in an interior of the dispensing device of FIG. 1.

Referring now to FIGS. 4 and 5, the inspection zone 46 includes a plurality of electronic components which are configured to automatically determine and/or verify the contents of a bottle 40. Specifically, in the exemplary embodiment, the inspection zone 46 includes a plurality of cameras 50 positioned at different locations, a plurality of light sources 52 which can project light in different directions, a code scanner 54, a label scanner 56, an ultrasonic sensor 58, and an agitator 60. The code and label scanners 54, 56 could be separate components from one another and from the cameras 50 or could be combined together or could be incorporated into one or more of the cameras 50. The agitator 60 is configured to lift the bottle 40 out of the opening of the carousel 42 and pivot the bottle 40 about a pivot point into the position shown in FIG. 5. The agitator 60 includes a built-in scale to measure the weight of the bottle 40 including the medications contained therein. As explained in further detail below, in use, the code and label scanners 54, 56 allow the dispensing device 20 to automatically determine the contents of the bottle 40. Based on the measured weight by the agitator 60 and known weights of an empty bottle 40 and of each pill 22 contained therein (once the medication type has been determined), the dispensing device 20 is thus able to determine a medication count for the bottle 40. Both the type and quantity of the pills 22 in the bottle can also be verified using images captured by the cameras 50 pointed at a translucent portion of the bottle and by a sonogram generated by the ultrasonic sensor 58.

In operation, when a bottle 40 is placed into the carousel 42, the carousel 42 is rotated about the first axis to bring that bottle 40 into the inspection zone 46. Next, the agitator 60 engages with and lifts the bottle 40 out of the carousel 42 and measures its weight. The light sources 52, the cameras 50, the code scanner 54, the label scanner 56, and the ultrasonic sensor 58 are all then activated to scan both an outer surface of the bottle 40 and the contents of the bottle 40. Specifically, the code and label scanners 54, 56 scan the outer surface of the bottle 40 for a label and/or a machine readable code (such as a bar code or a QR code) with data related to the contents of the bottle 40 is. The cameras 50 also directly view the pills 22 within the bottle 40, and the images generated by the cameras 50 can be scanned to determine the shape, size, and etchings of the pills 22. The ultrasonic sensor 58 scans the bottle 40 to generate a sonogram of the bottle 40 and its contents. The dispensing device 20 compares the weight measurement sensed by the agitator 60, the images captured by the cameras 50, and the sonogram generated by the ultrasound sensor 58 against an artificial intelligence database to verify both the type and quantity of pills 22 contained in the bottle 40. The artificial intelligence database is preferably maintained in a remote server and is be periodically downloaded to a memory 1802 (shown in FIG. 18 and discussed in further detail below) in the dispensing device 20 to improve performance of the dispensing device 20. The dispensing device 20 also preferably uploads images and sonograms which are generated by the cameras 50 and the ultrasound 58 to the database to improve the database.

The agitator 60 may be activated to shake the bottle 40 and its contents if any of the images generated by the cameras 50 and/or if the sonogram generated by the ultrasound sensor 58 is not clear. Once the imaging and sensing operation is completed and the pills 22 have been verified, the agitator 60 returns the bottle 40 to the carousel 42, and the carousel 42 may be rotated to move the bottle 40 out of the inspection zone 46. The automatic detection and determination of the pill 22 in the bottle 40 allows for a strong user experience, which promotes improved adherence, safety, and user satisfaction. The agitator 60 may also be used to assist with singulating pills 22 for dispensing.

The agitator 60 can also shake the bottle to move the contents into a new position and the imager can capture multiple images of the contents in the bottle. These additional images can be used in the predictive model for training and validation operations. These additional images, e.g., photographs, provide filed data of the bottles with a known quantity of pills therein. The dispensing device can use its agitator 60 to change the position of the pills and then take multiple images. A larger data set leads to better operation of the predictive models and may improve operation of all dispensing devices collectively based on an improved predictive model.

Figure 11:
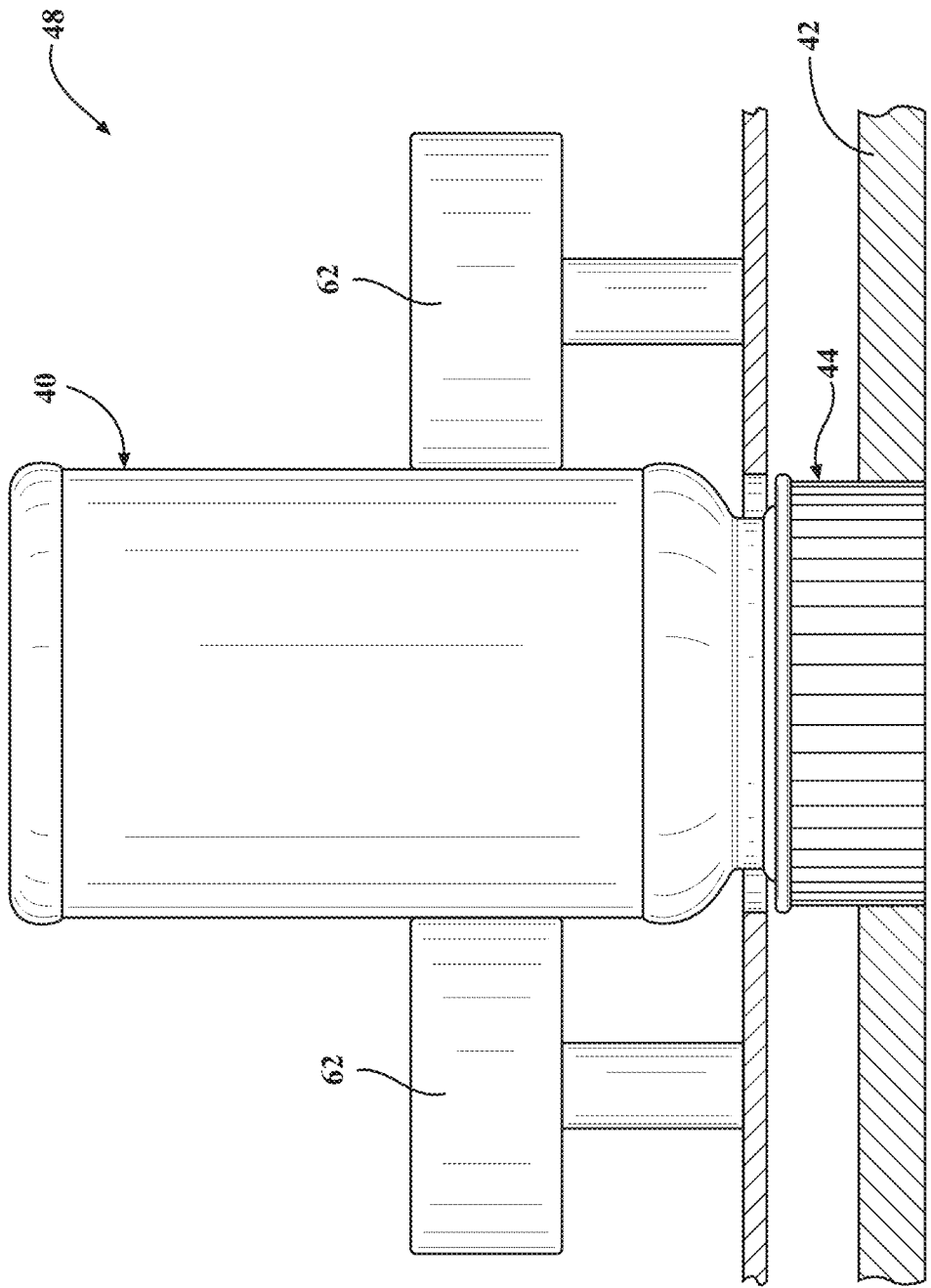
FIG. 11 is a partially cross-sectional view showing a bottle in a dispensing zone of the dispensing device of FIG. 1.

As discussed in further detail below, the cap 44 on the bottle 40 is configured to singulate and dispense pills 22 only when the bottle 40 is rotated by the dispensing device 20 when the bottle 40 is in the dispensing zone 48. As shown in FIG. 11, the dispensing zone 48 of the exemplary embodiment includes at least one drive wheel 62 which, in operation, directly engages with an outer surface of the bottle 40 and rotates the bottle 40 through the force of friction between the drive wheel 62 and the bottle 40. When the bottle 40 is brought into the dispensing zone 48, either the drive wheel(s) 62 can be moved into contact with the bottle 40 or the bottle 40 can be moved into contact with the drive wheel(s) 62 or both. In the exemplary embodiment, the dispensing zone 48 includes two drive wheels 62. However, in other embodiments, the dispensing zone 48 includes only a single drive wheel 62 or three or more drive wheels 62. The dispensing zone 48 may also include one or more undriven wheels to counter any radial force being applied on the bottle 40 by the drive wheel(s) 62. The drive wheels 62 are preferably driven in rotation by electric motors (not shown).

Figure 3:
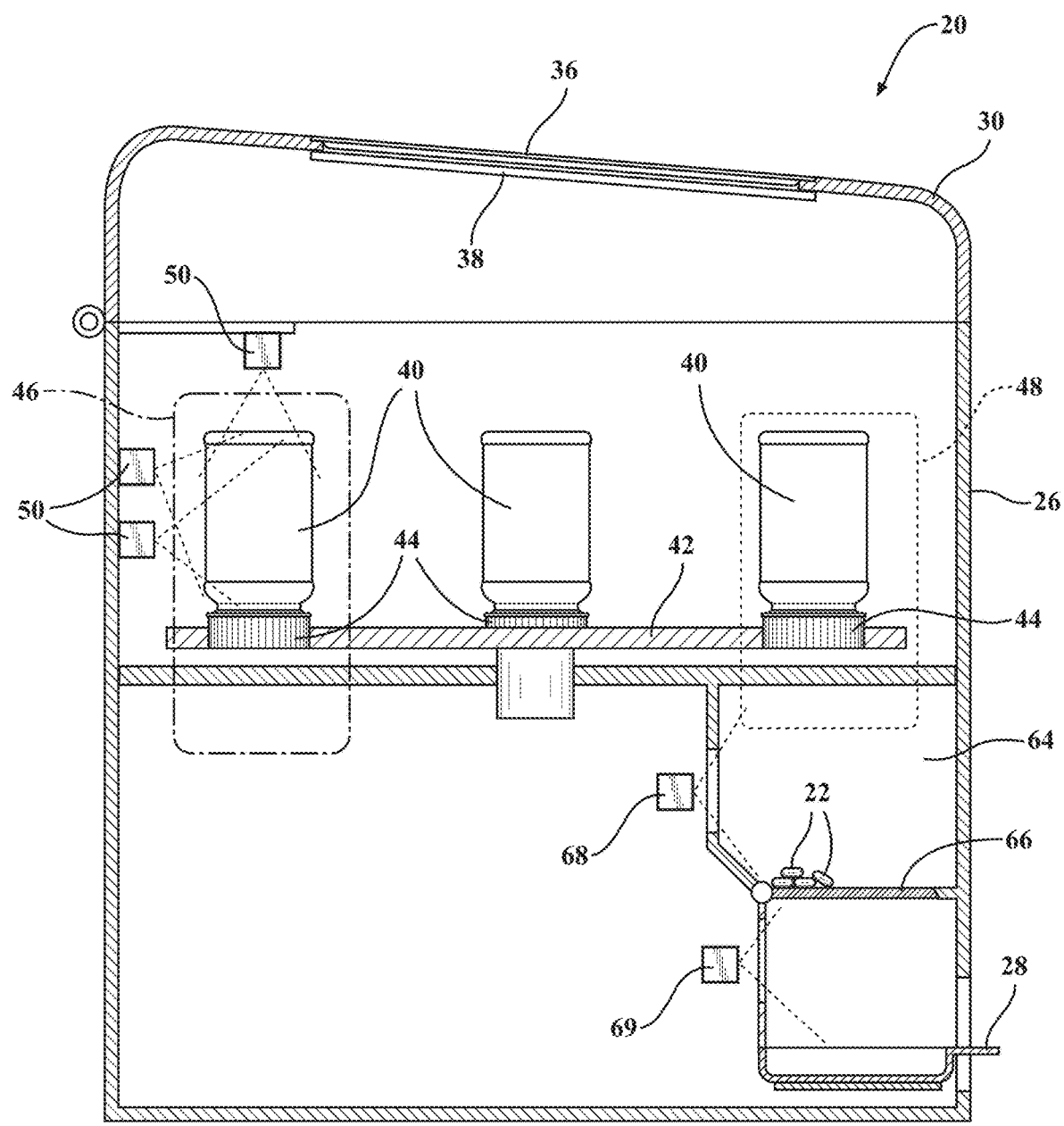
FIG. 3 is a cross-sectional view of the dispensing device of FIG. 1.

Referring back to FIG. 3, the dispensing device 20 further includes a staging zone 64 which is located directly beneath the dispensing zone 48 for catching pills 22 dispensed by the bottle 40 in the dispensing zone 48 and conveying those pills 22 to the dispensing tray 28 only after a final verification that the quantity and type of pills 22 released from the bottle 40 is correct. Specifically, the staging zone 64 includes a gate 66 which remains closed between dispensing events and can be selectively opened to allow the pills 22 to continue to the dispensing tray 28. The staging zone 64 includes a camera 68 and/or other sensor(s) which scans the medications 22 dispensed out of the bottle 40 while the gate 66 is closed. The dispensing device 20 then compares the images or information gathered by the camera 68 and/or other sensors against the database and against the medication that was requested (either automatically according to a predetermined schedule or on demand) to complete the final verification process. The dispensing device 20 only opens the gate 66 to allow the pills 22 to be released to the dispensing tray 28 upon confirmation by the dispensing device 20 that the dosage is correct. If the types of pills 22 in the staging zone 64 is not correct or cannot be verified or the quantity of pills 22 in the staging zone 64 is too high, then the dispensing device 20 may display an alert on one of the display screens 36, 38 or sound an alert through the speaker 32. If the quantity of pills 22 in the staging zone 64 is too low, then the dispensing device 20 can re-activate the drive wheel 62 in the dispensing zone 48 to dispense one or more additional pills 22 from the bottle 40 into the staging zone 64.

The dispensing device 20 further includes a camera 69, or another type of sensor, adjacent the dispensing tray 28 for verifying that the user has retrieved the pills 22 from the dispensing device 22. If retrieval is not detected after a predetermined time, then the dispensing device 20 may automatically send an alert to the user. The alert could be, for example, visual on the first display screen 36, audible through the speaker 32, or it could be sent directly to the user's external device 24.

Figure 6:
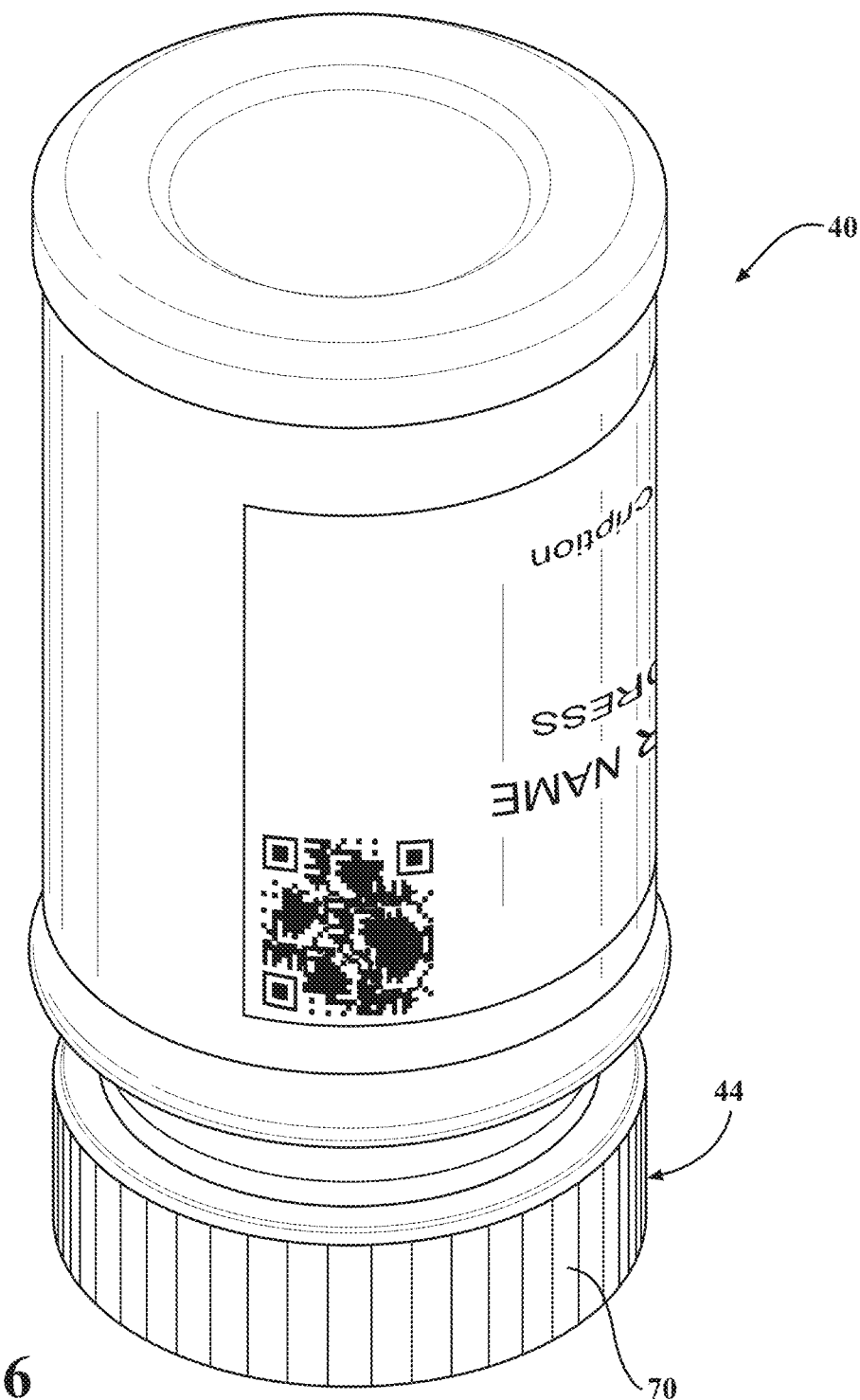
FIG. 6 is an exemplary medication bottle including a cap assembly which can cooperate with a carousel in the dispensing device of FIG. 1.
Figure 7A:
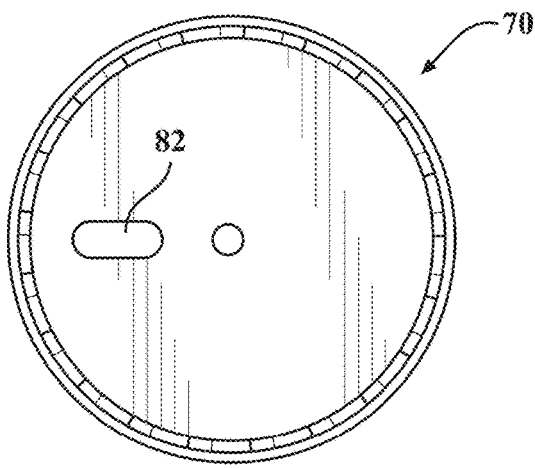
FIG. 7A is a top elevation view of an outer cap of the cap assembly on the bottle of FIG. 6.
Figure 7B:
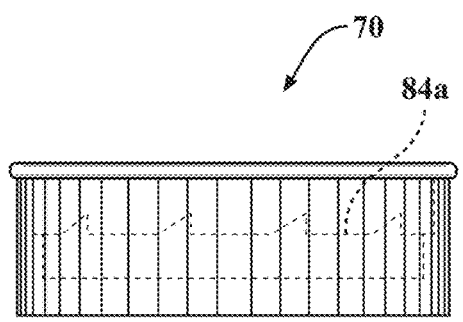
FIG. 7B is a front elevation view of the outer cap of FIG. 7A.
Figure 8A:
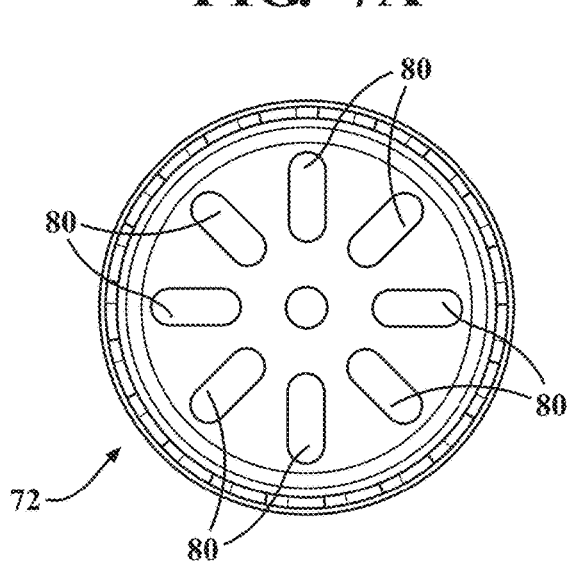
FIG. 8A is a top elevation view of an inner cap of the cap assembly on the bottle of FIG. 6.
Figure 8B:
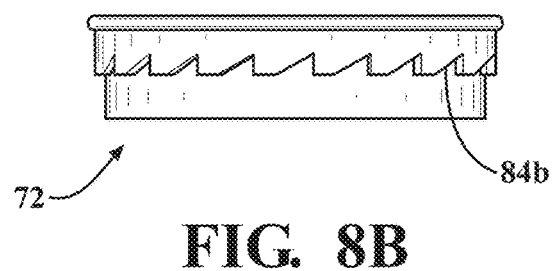
FIG. 8B is a front elevation view of the inner cap of FIG. 8A.
Figure 8C:
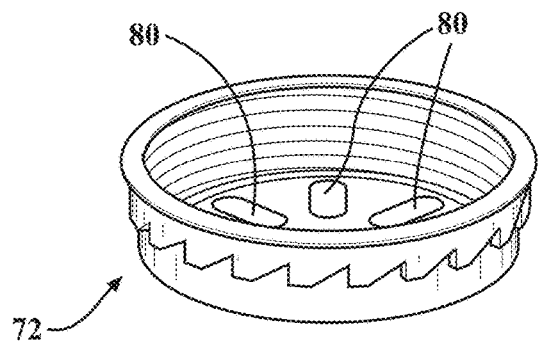
FIG. 8C is a perspective elevation view of the inner cap of FIG. 8A.
Figure 9A:
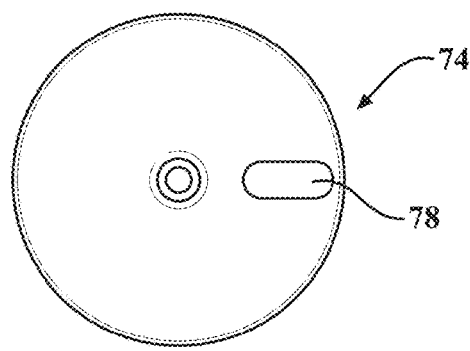
FIG. 9A is a top elevation view of a disk of the cap assembly of the bottle of FIG. 6.
Figure 9B:
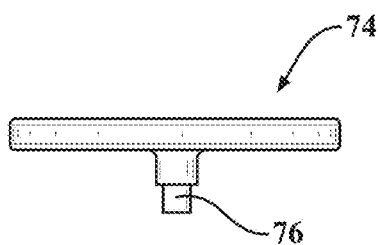
FIG. 9B is a front elevation view of the disk of FIG. 9A.
Figure 10:
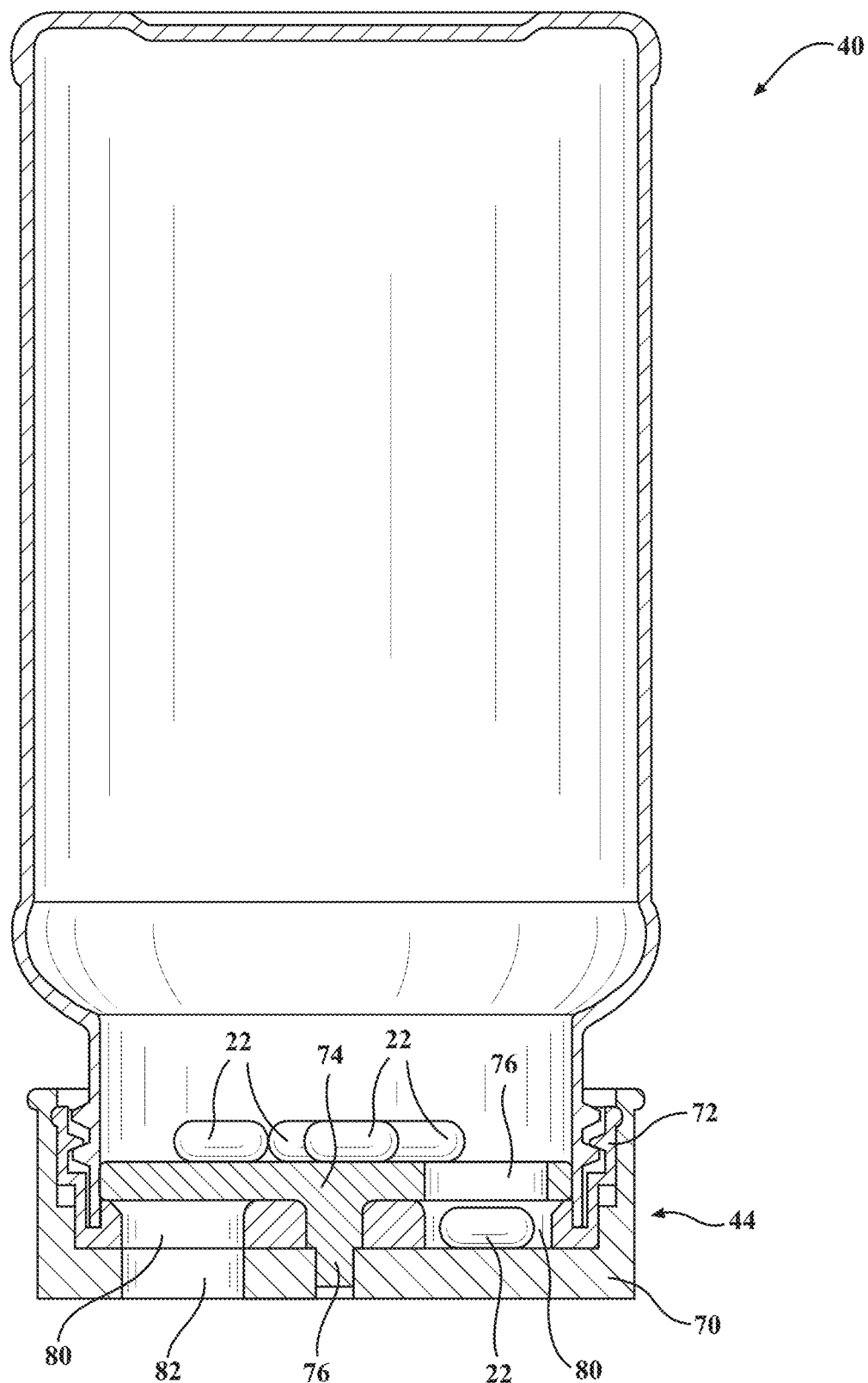
FIG. 10 is a cross-sectional view of the bottle of FIG. 6.

The dispensing device 20 further includes a plurality of caps 44 which are configured to thread onto (or otherwise engage with) an original medication bottle 40 so that the original bottle 40 can be used with the dispensing device 20, which is in contrast to other known devices wherein the medication must be removed from the bottle. In many cases, the cap 44 can be fitted directly with an original medication bottle 40 by simply unthreading the original cap and threading the cap 44 onto the bottle 40 in its place. For example, FIG. 6 shows one such cap 44 as fitted onto an original medication bottle 40. Allowing the pills 22 to remain in their original bottles 40 may also enhance convenience for a user by allowing the user to travel with the medications contained in the dispensing device 20 in jurisdictions that have laws which strictly govern the labeling of prescription medications. Further, the added convenience by not requiring the user to transfer the pills 22 out of an original bottle 40 and into either a different container or directly into the dispensing device 40 may improve safety, particularly for users who have numerous and/or complex dosing regiments and for users who have limited visual and/or cognitive functionality. Differently sized inner caps can accommodate and singulate differently sized and shaped pills. For example, a first inner cap may be configured to accommodate a first type of pill, and a second inner cap may be configured to accommodate a second type of pill that is either larger or smaller than the first type of pill.

As discussed above, the cap 44 is configured to singulate and dispense pills 22 out of the bottle 40 in response to rotation of the bottle 40 in the dispensing zone 48 of the dispensing device 20. With reference now to FIGS. 7-10, to singulate and dispense the pills 22, the cap 44 includes a total of three pieces: an outer cap 70, an inner cap 72, and a disk 74. The outer and inner caps 70, 72 each are generally cup-shaped with an open top, a flat bottom, and a cylindrical side wall extending axially from the flat bottom. Although the outer and inner caps 70, 72 have similar general shapes, the inner cap 72 has a lesser outer diameter than the outer cap 70. This allows the inner cap 72 to be nested within the outer cap 70 in a slip-fit manner, i.e., the fit between the outer and inner caps 70, 72 is loose. The disk 74 includes a centrally located probe 76 which extends axially through a similarly shaped hole in the inner cap 72 and which is fixedly attached (such as through ultrasonic welding) with the outer cap 70. Thus, the outer cap 70 and disk 74 are fixedly attached with one another via the probe 76, and the inner cap 72 is able to rotate relative to the outer cap 70 and disk 74. The side wall of the inner cap 72 has female threads, which are visible in FIG. 8C, that allow the inner cap 72 to be threaded onto the bottle 40, as discussed below. All three components of the cap 44 are preferably made of a rigid polymeric material and are preferably made through respective injection molding operations.

The disk 74 has a single pill opening 78 that is spaced radially from the second axis and that is shaped to pass only a single pill 22 through the disk 74 at a time. The shape and size of the pill opening 78 thus depends on the shape and size of the pills 22 contained in the bottle 40. The inner cap 72 has a plurality of similarly shaped pill openings 80 which are spaced apart from one another and which are each sized to only receive a single pill 22 from the pill opening 78 in the disk 74. The outer cap 70 has a single pill opening 82 that is circumferentially offset from the pill opening 78 in the disk 74, i.e., the pill openings 78, 80, 82 of the disk 74, inner cap 72, and outer cap 70 respectively cannot be aligned with one another. Due to the single pill size of each of these pill openings 78, 80, 82, it is thus only possible to dispense a single pill 22 through the cap 44 at a time.

In operation, to dispense a pill 22 from the bottle 40 being held by the carousel 42 in the dispensing zone 48, the drive wheels 62 are engaged with an outer surface of the bottle 40 and are activated to rotate the bottle 40 along with the inner cap 72. If an open pill opening 80 of the inner cap 72 is brought into alignment with the pill opening 78 in the disk 74, then a pill 22 will fall under the influence of gravity into the pill opening 80 of the inner cap 72. In a similar manner, when rotation of the bottle 40 and the inner cap 72 about a bottle axis brings a filled pill opening 80 in the inner cap 72 into alignment with the pill opening 82 of the outer cap 72, then that pill 22 will fall under the influence of gravity out of the cap 44 and downwardly into the staging zone 64 (shown in FIG. 4). As discussed above, a final inspection is then performed on the pill 22 and any additional pills 22 prior to dispensing to the dispensing tray 28.

The outer and inner caps 70, 72 are provided with cooperating rotation limiting features 84a, 84b to allow the threading of the inner cap 72 onto the bottle 40 without inhibiting the rotation of the inner cap 72 relative to the outer cap 70 during the dispensing operation. In this embodiment, the rotation limiting feature 84a of the outer cap 70 includes a plurality of teeth that are angled in one direction, and the rotation limiting feature 84b of the inner cap 72 includes a plurality of teeth that are angled in an opposite direction. When threading the cap 44 onto the bottle 40, the teeth engage with one another to allow the inner cap 72 to rotate with the outer cap 70 and thread onto the bottle 40.

Figure 12:
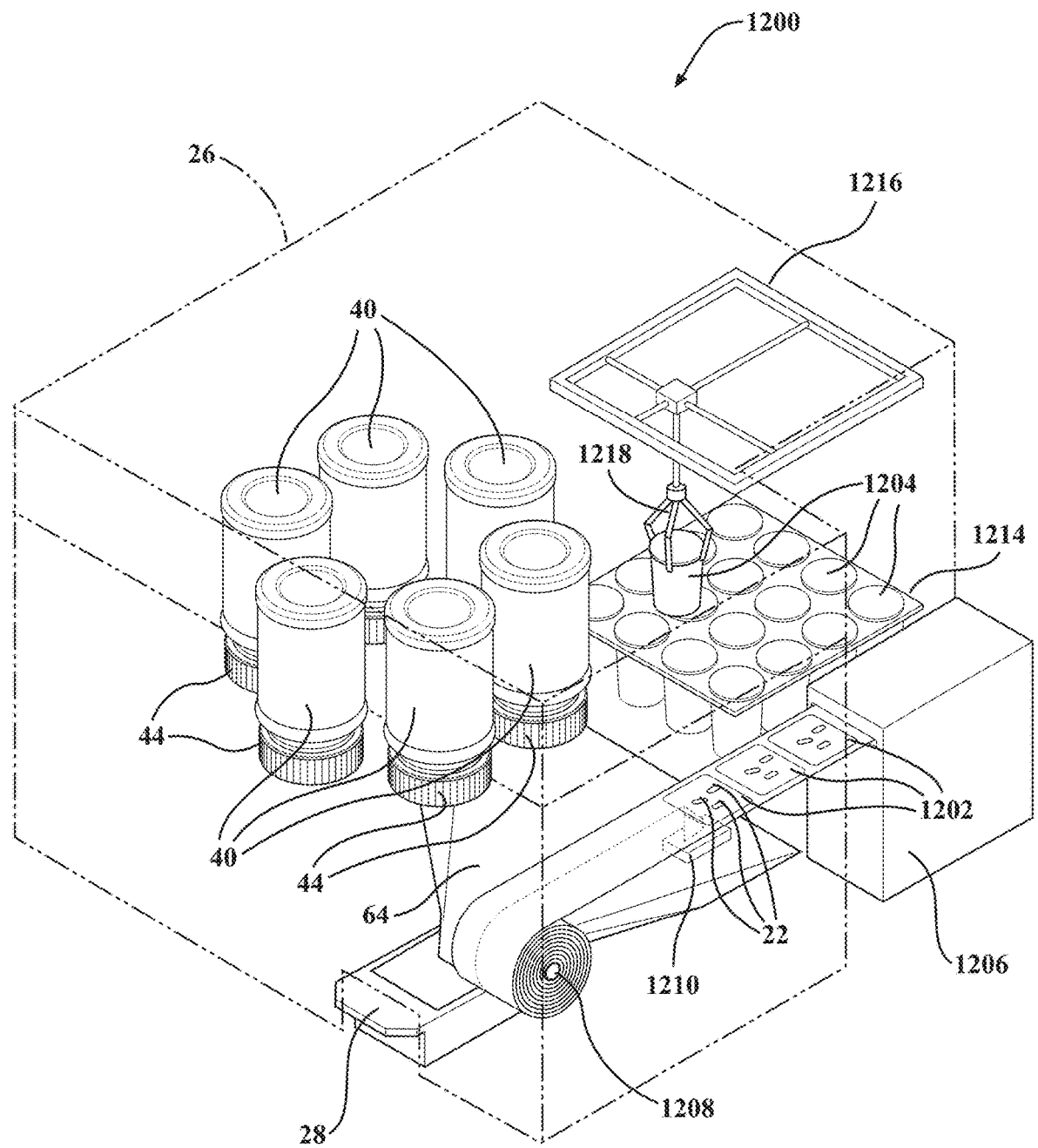
FIG. 12 is a fragmentary view of a dispensing device constructed according to a second embodiment of the present disclosure.

Referring now to FIG. 12, another exemplary embodiment of the dispensing device 1200 is generally shown with certain elements that are similar to or identical with the above-discussed embodiment being removed for clarity purposes. In this embodiment, in addition to bottles 40, the dispensing device 1200 is also configured to automatically dispense from two other types of original medication containers, namely plastic pack pouches 1202 (or blister packs) and also from individual pill cups 1204.

In this embodiment, at least a portion of the staging zone 1264 has the shape of a funnel with a large catching end that faces towards the dispensing zone and which is sized to extend well beyond the periphery of the dispensing zone for catching pills 22 dispensed from all of the bottles 40, the plastic pouches 1202, and the pill cups 1204. In other words, pills 22 from any of these containers 40, 1202, 1204 can all be automatically dropped by the dispensing device 1200 into the large catching end of the staging zone 1264 and ultimately dispensed out of the same dispensing tray 28.

The plastic pouches 1202 are all strung together in a single piece of tubing that is initially wound around a spool within a container 1206. In this embodiment, the container 1206 is external to the housing 26 but may be enclosed within the housing 26 in other embodiments. Each pouch 1202 may include one or more than one pill 22, and for pouches 1202 that contain multiple pills 22, they may be the same or different types of medications. The dispensing device 1200 includes a wind-up spool 1208 which is located in the interior of the housing 26 on an opposite side of the funnel-shaped portion of the staging zone 1264 from the container 1206 such that the pouches 1202 must pass over the large catching end of the staging zone 1264 when travelling from the container 1206 to the wind up spool 1208.

Figure 14A:
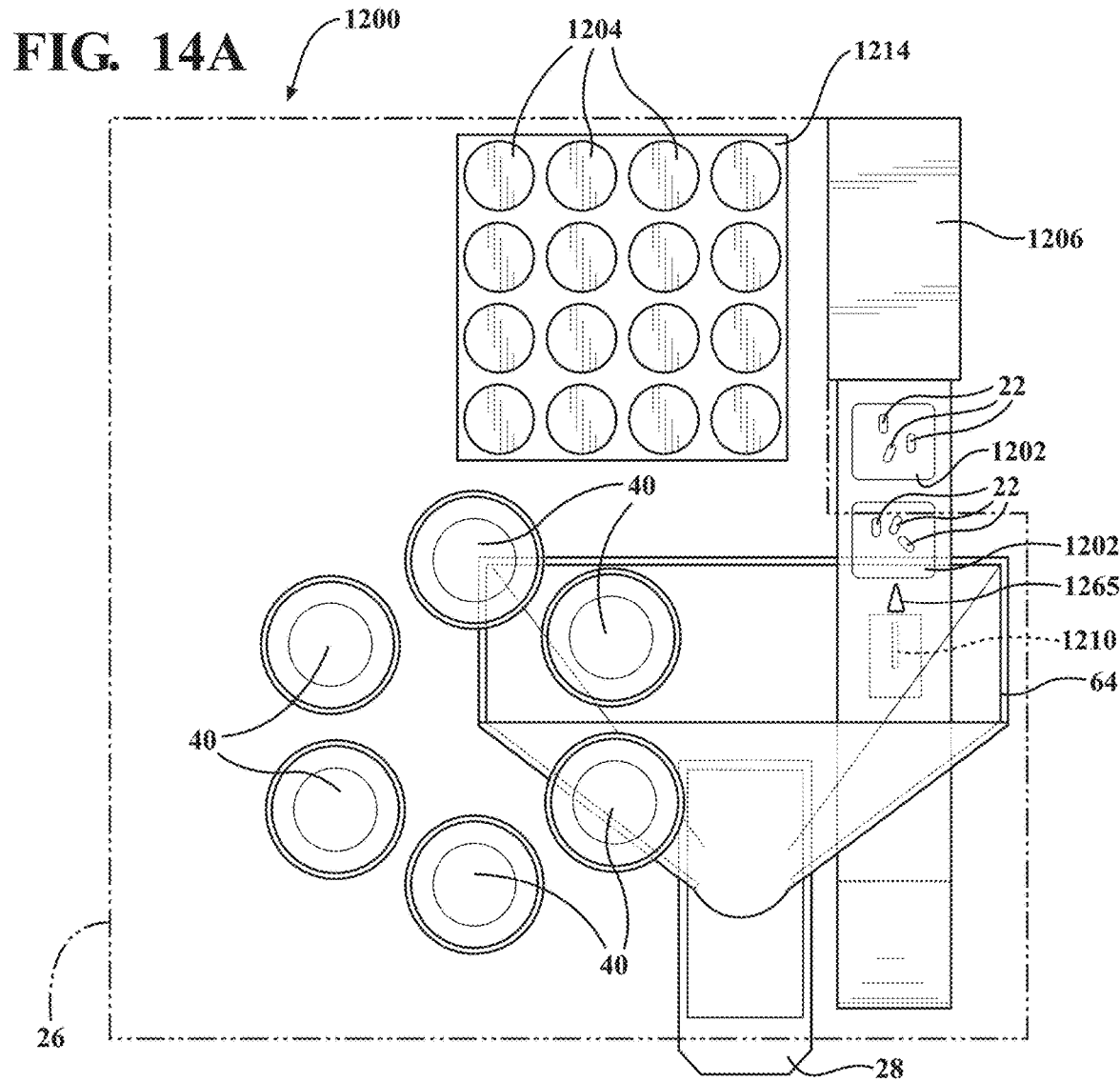
FIG. 14A is a top and fragmentary view of the dispensing device of FIG. 12.
Figure 14B:
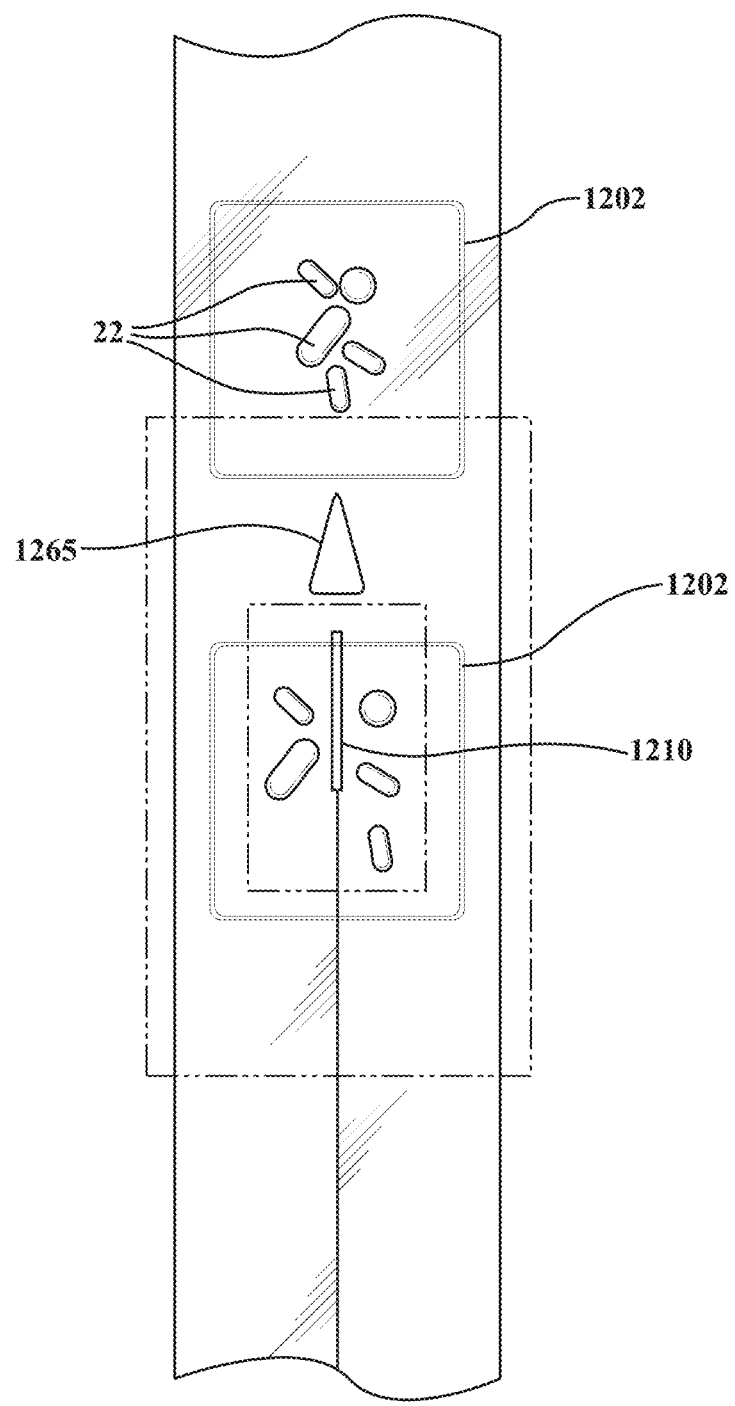
FIG. 14B is an enlarged view of a portion of the dispensing device of FIG. 14A and focusing on a cutter.
Figure 15:
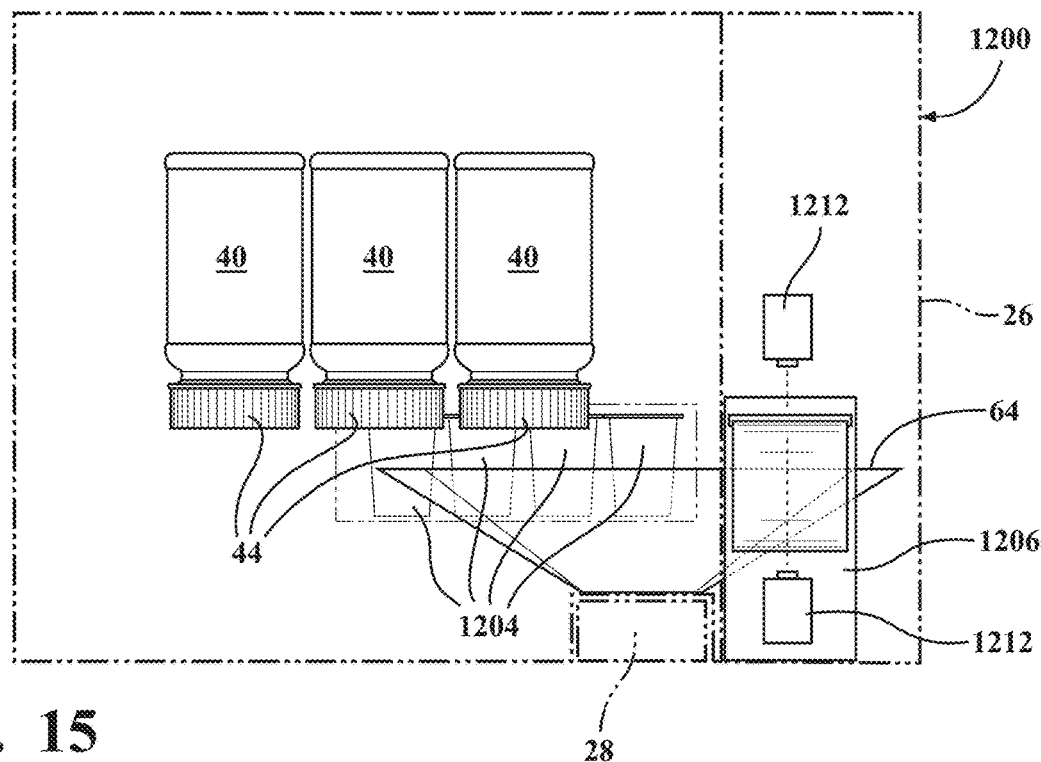
FIG. 15 is a front and fragmentary view of the dispensing device of FIG. 12.

To release the pills 22 from the pouches 1202, the dispensing device 1200 includes a cutting device 1210 (such as a blade) which is positioned directly above the large catching end of the staging zone 64. In use, the wind-up spool 1208 is rotated by an actuator (such as an electric motor) to position one of the pouches 1202 directly over the large catching end of the staging zone 64. Next, an actuator (not shown) is activated to urge the cutting device 1210 against the pouch 1202 and cut a slit into only a lower surface of the pouch 1202 without separating the pouch 1202 from the tubing. Any pills 22 contained in the pouch 1202 will fall under the influence of gravity into the staging zone 1264 for final inspection prior to dispensing out of the dispensing device 1200 via the dispensing tray 28. As shown in FIG. 15, the dispensing device 1200 further includes a pair of scanners 1212 (such cameras) which are located above and below the tubing containing the pouches 1202 upstream of the cutting device 1210 for scanning any labeling on the pouches 1202 and/or directly scanning the pills 22 contained inside of the pouches 1202 prior to dispensing the pills 22. As shown in FIG. 14B, in an exemplary embodiment, a redirecting feature 1265 is positioned immediately upstream of the cutting device 1210 to urge any pills away from the location of the cutting device 1210. In the exemplary embodiment, the redirecting feature is generally V or wedge shaped. In other embodiments, the redirecting feature 1265 could be linear and angled relative to the direction of travel of the tubing with the pouches 1202. In operation, the redirecting feature 1265 may press on the tubing to urge the pills away from the center of their respective pouches 1202. In some embodiments, the cutting device may be positioned above the tubing and may cut the pouches from the top and all the way through the tubing. In another embodiment, the redirecting feature may include one or more rollers that are configured to "squeeze" the pills from one side of a pouch to the other. Once the cutting device cuts the pouch, then another set of rollers can force the pills in the direction of the cut and out of the pouch.

Figure 13A:
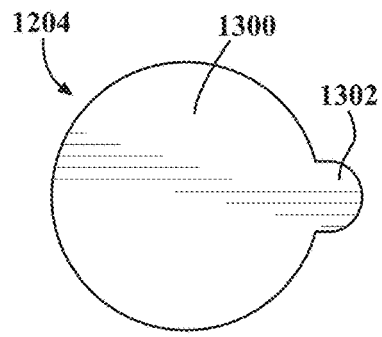
FIG. 13A is a top elevation view of a pill cup that can be disposed in the dispensing device of FIG. 12.
Figure 13B:
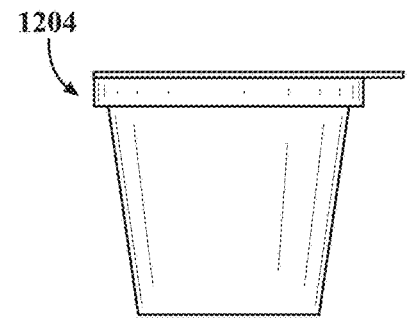
FIG. 13B is a front elevation view of the pill cup of FIG. 13A.
Figure 13C:
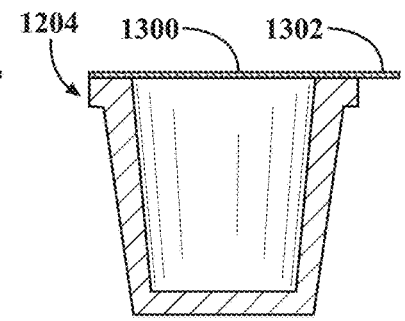
FIG. 13C is a cross-sectional view of the pill cup of FIG. 13A.

Referring now to FIGS. 13A-C, an exemplary pill cup 1204 is generally shown. The pill cup 1204 has an open top and a closed base and has a shape which allows it to nest with other pill cups 1204 so that multiple pill cups 1204 can be packaged together in a compact manner either before they are filled or after they are emptied. Specifically, a base of the pill cup 1204 has a first dimension (e.g., a circular footprint with a first diameter) and a top of the pill cup 1204 has a second dimension (e.g., circular footprint with a second diameter) that is larger than the first dimension. The pill cup 1204 has a sloping side wall which extends from the smaller base to the larger top. In the exemplary embodiment of FIG. 13B, a removable lid 1300 made of a film material is adhesively attached with the top of the pill cup 1302 for containing the pills 22 within the pill cup 1302. The removable lid 1300 preferably contains a label with contents information and dosing instructions. The lid 1300 includes a tab 1302 which can be grasped either by a user or by a machine to peel the lid 1300 away from the pill cup 1204.

The pill cups 1204 may be configured to provide a volume within which the desired number of pills 22 may be dispensed without excessive wasted volume. Specifically, the pill cups 1204 are preferably sized to have an interior volume which is large enough to hold all of the pills 22 necessary for a single dosing event. Thus, each pill cup 1204 may correspond to a scheduled dosing event in a multi-drug regimen. By way of example and not limitation, the approximate dimensions of the pill cup 1204 may be 1.25 to 1.5 inches in diameter and 1 to 1.5 inches deep for small cups and 1.5 to 2 inches in diameter and 2.25 inches deep for large cups. The pill cups 1204 are preferably constructed using a rigid or semi-rigid material, such as various types of polymer or plastic which are capable of maintaining the form of the pill cup 1204 to protect the pills 22 contained therein in a range of environments, including in a pharmacy where the pill cup 1204 is filled and during shipment from the pharmacy to the user. By way of example, the material may include food packaging materials, such as polyethylene. For example, the material may be made from recyclable polypropylene #5 plastic similar to a yogurt or butter container or cellulose polypropylene. The material may be a multilayer blend of polymers. The thickness of the side walls is preferably chosen to provide the pill cup 1204 with the desirable durability characteristics. A desirable characteristic may be to avoid an overly strong container which may indicate to the user wasted material. Thus, for example, the pill cup 1204 may be constructed to be weak enough for a person to easily squeeze the pill cup 1204 in the person's hand to collapse the pill cup 1204 when its lid 1300 has been removed and it has been emptied, yet strong enough to maintain its form prior to removal of the lid 1300.

Referring now to FIG. 15, the pill cups 1204 are disposed within a plurality of openings on a tray 1214 that is located in the interior of the housing 26. Each pill cup 1204 may include one or more pills 22 (not shown in this Figure). For pill cups 1204 that contain multiple pills 1204, the pills 22 may the same type of medication or different types of medications, i.e., a single pill cup 1204 may be customized to include all of the medications required for a single dosing event. The tray 1214 is removeable from the interior of the housing 126 either through an opening exposed when the lid 30 of the housing 26 is opened (see FIG. 2) or through a door in a side wall of the housing 26 so that the tray 1214 can be refilled with additional pill cups 1204. The pill cups 1204 may be arranged into the tray 1214 according to a known pattern, e.g., the pill cups 1204 can be arranged according to a pattern which is based on the chronological order of dosing events. In some embodiments, the contents of the pill cups 1204 can be input into the dispensing device 1200 either manually or automatically, for example, by scanning the pill cups 1204 either prior to or after tray 1214 is placed into the dispensing device 1200.

As shown in FIG. 12, the dispensing device 1200 includes a picking mechanism 1216 which can individually lift pill cups 1204 out of the tray 1214 and deposit either just the pills 22 contained in the pill cups 1204 or the full pill cups 1204 into the funnel-shaped portion of the inspection zone 46. Preferably, the picking mechanism 1216 engages each pill cup 1204 by its respective rim while leaving at least a portion of the lid 1300 so that the information contained on the lid 1300 can be scanned prior to dispensing the pills 22 into the inspection zone 146 of the dispensing device 120.

In the exemplary embodiment, the picking mechanism 1216 is a three-dimensional gantry 1216 which includes a gripping mechanism 1218 that can engage and lift any one of the pill cups 1204 out of the tray 1214 and carry that pill cup 1204 to a position directly above the large catching end of the staging zone 1264. Either when the pill cup 1204 is directly above the inspection zone 1204 or prior to the pill cup 1204 reaching the position above the staging zone 1264, a scanner 1220 (such as a camera) scans the lid 1300 of the pill cup 1204 to confirm that the contents of the pill cup 1204 matches the dispensing instructions. The gantry 1216 then releases the full pill cup 1204 into the staging zone. The gantry 1216 includes a frame and one or more actuators which are able to move the gripping mechanism 1220 in three-dimensions, namely, X and Y horizontal directions and a Z vertical direction.

Figure 16A:
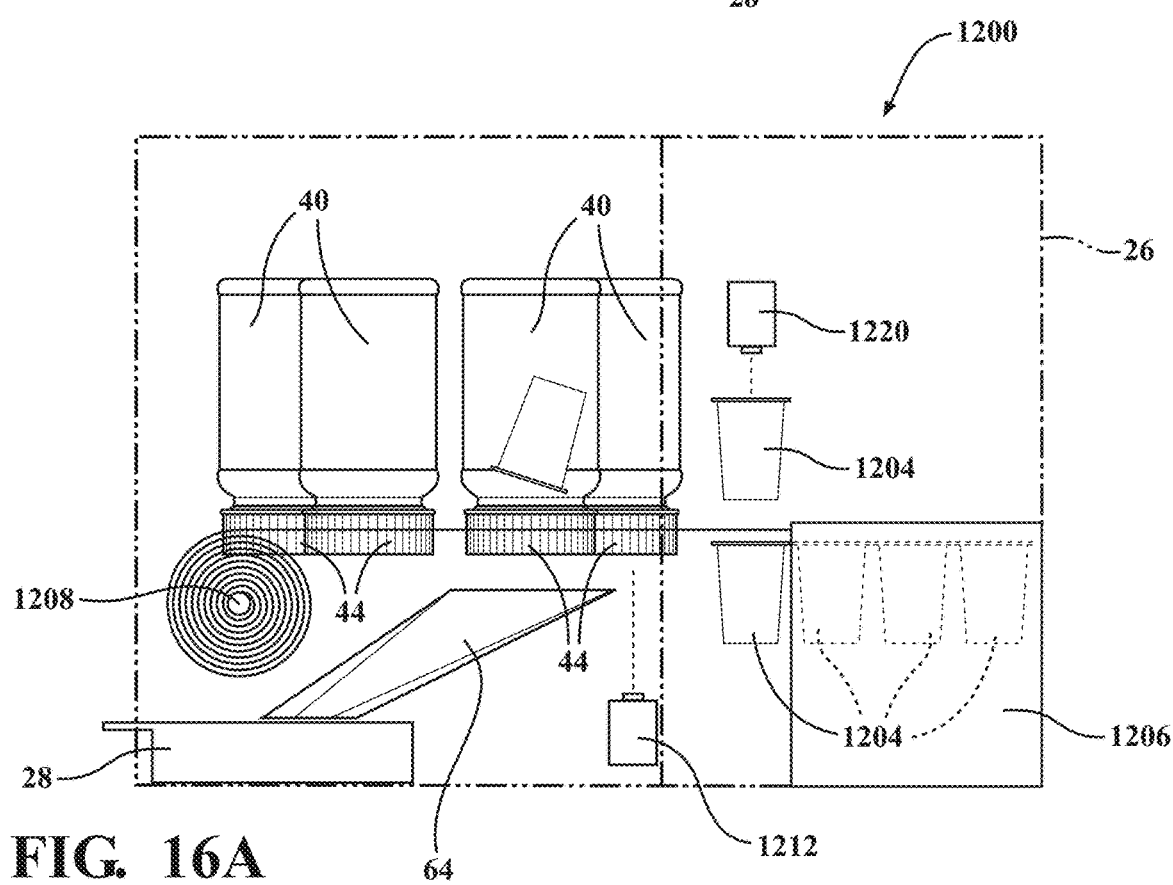
FIG. 16A is a side and fragmentary view of the dispensing device of FIG. 12.
Figure 16B:
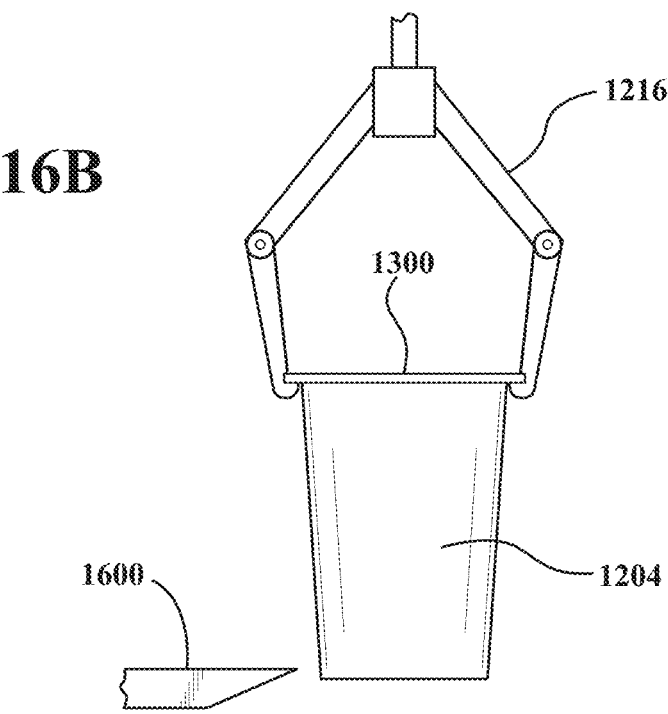
FIG. 16B is a side elevation view illustrating a gantry holding a pill cup prior to a cutting operation.
Figure 16C:
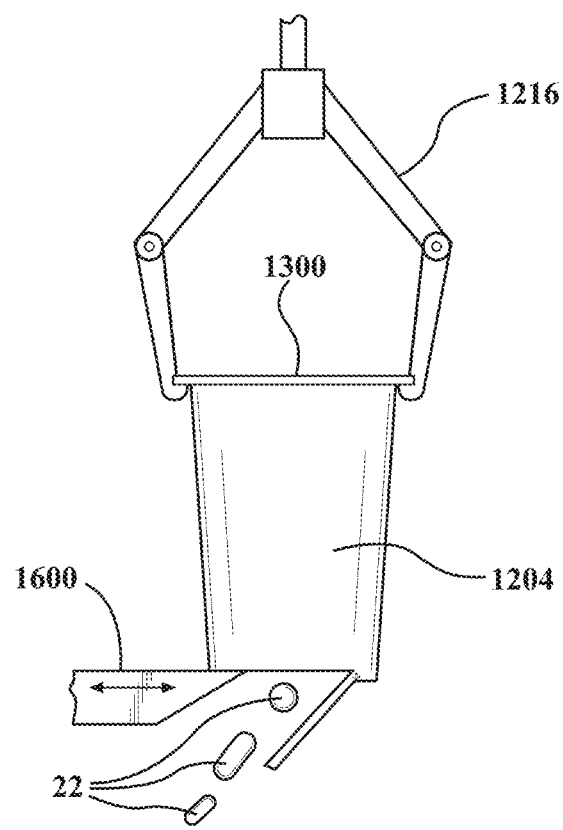
FIG. 16C is a side elevation view illustrating the gantry holding the pill cup during a cutting operation.

In operation, when a particular pill cup 1204 is requested (either on demand or according to an automatic dispensing schedule), the gantry 1216 moves the gripping mechanism 1218 in the X and Y directions to a location directly above the requested pill cup 1204. Next, the gripping mechanism 1218 is lowered in the Z-direction and is actuated to engage with the pill cup 1204. The gripping mechanism 1218 then lifts the pill cup 1204 out of the tray 1214 and to a location above the funnel-shaped staging zone 1264. The gantry 1218 is then actuated to move the pill cup 1204 to the scanner 1220 which scans the lid 1300 to confirm that it contains the correct contents. In this embodiment, the gripping mechanism 1218 releases the pill cup 1204 into the staging zone 1264. In other embodiments, the lid 1300 of the pill cup 1204 is either removed or cut to dispense the pills 22 directly into the staging zone 1264 without also dispensing the packaging of the pill cup 1204. For example, in one alternate embodiment, the cutting device 1210, or a separate cutting device, may be actuated to cut the lid 1300 such that the pills 22 will fall out of the pill cup 1204 through the cut. In another embodiment, a peeling mechanism (not shown) may grab the tab 1302 on the lid 1300 and peel the lid 1300 away from the pill cup 1204. For example, in the embodiment of FIGS. 16B and 16C, the gantry 1218 brings the pill cup 1204 to a cutting device 1600, which cuts a bottom out of the pill cup 1204 to allow the pills 22 to fall out of the pill cup 1204 and into the staging zone 64. The cutting device 1600 may be an ultrasonic cutter or any suitable type of cutting mechanism. During the cutting operation, the gantry 1218 may move the pill cup 1204 relative to the cutting device 1600 or vice versa. In some embodiments, the gantry 1218 could invert the pill cup 1204 and the cutting device 1600 could cut the top of the pill cup 1204. In these embodiments, once the pill cup 1204 is emptied, the gantry 1216 may place it into a dispensing area of the interior of the dispensing device 1200. In some embodiments, a robotic arm, such as a six-axis robotic arm could be employed in place of the gantry to lift the pill cups 1204 and either deposit the pill cups 1204 directly into the staging zone 64 or to the cutting device 1600, which cuts the pill cups 1204 to drop the pills 22 into the staging zone 64.

Figure 17A:
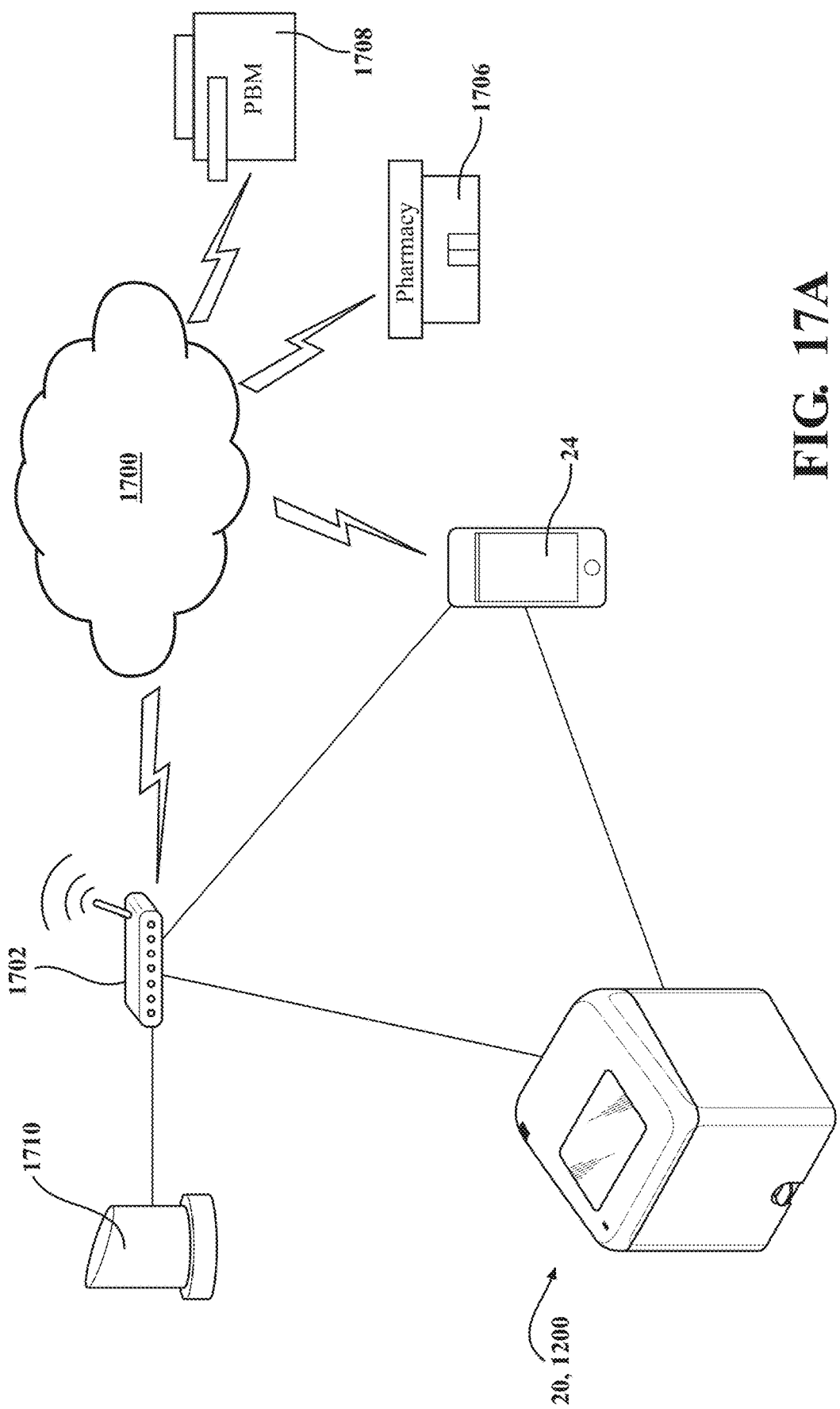
FIG. 17A is a schematic view showing a communication system in which the dispensing device can operate.

FIG. 17A is a schematic view showing an eco-system in which either of the dispensing devices 20, 1200 can operate. The dispensing device 20, 1200 is electrically connected with the internet 1700 via a portal, such as a router 1702 (wired or wireless) or the external device 24 or through any suitable internet gateway. Through the internet 1700, the dispensing device 20, 120 is able to communicate with a pharmacy 1706 and with a pharmacy benefit manager 1708. Thus, the pharmacy 1706 and pharmacy benefit manager 1708 can monitor the dispensing of the pills 22 out of the dispensing device 20, 1200 to monitor a user's compliance to his or her medication schedule. In some embodiments, the pharmacy 1706 and/or the pharmacy benefit manager 1708 can automatically order a new prescription in response to the quantity of that medication in the dispensing device 20, 1200 falling below a predetermined threshold. The dispensing device 20, 1200 can also communicate with the external device 24 or with a voice assistant 1710 (such as those sold by Google®, Amazon®, and Apple®) directly and/or via the router 1702.

The dispensing device 20 may use its communication functions, e.g., audio, VOIP or text, to call a pharmacist device. When this communication is established the dispensing device may encrypt the communication to ensure private communication. Such a communication can address medication concerns or questions. The communication functions can include the display, the microphone and the speaker built into the dispensing device, each of which can be controlled by control circuitry and use transmission circuitry to communicate with remote devices. In an example embodiment, the dispensing device may use its display to show video of the pharmacist (or nurse) speaking in real-time for a more personal interaction with the patient.

Additional devices may communicate with other devices parties in the communication system. The additional devices can be a payer device or a prescriber device. The payer device can be part of an adjudication system or an insurance company system, The prescriber device may be part of a medical care facility or individual medical care provider computing system, may be the prescriber of the medication and the payer (such as insurance company). These additional devices may be directly connected or indirectly connected in which case the PBM or pharmacy could be an intermediary to the payer or prescriber devices.

For example, the user of the dispensing device 20, 1200 may interact with the external device 24 to provide various voice commands. The voice commands may indicate the user's desire to refill a prescription, dispense daily or periodic medications, or other suitable voice commands. The external device 24 may communicate with the dispensing device 20, 1200 to provide data corresponding to the voice commands. The dispensing device 20, 1200 may take action in response to receiving the data from the external device 24. For example, the dispensing device 20, 1200 may communicate with the pharmacy 1706 to refill a prescription based on the data received from the external device 24. It should be understood that the dispensing device 20, 1200 may receive any suitable data from the external device 24 and may take any suitable action in response to the data.

In some embodiments, the dispensing device 20, 1200 may include an input device configured to receive audible signals. The input device may include a microphone or other audio input device. The audible signals may include voice commands from the user (e.g., or caretaker and the like), an audible indication from a mobile computing device (e.g., a wearable device, a smart phone, and the like), any other suitable audible signal, or a combination thereof. For example, the user may provide voice commands directly to the dispensing device 20, 1200 using the input device. In some embodiments, the input device may be configured to communicate with a device that can process the user's brain pattern activities such that the user can provide a demand for a pill to the dispensing device 20, 1200 without any physical or audible action.

Additionally, or alternatively, the dispensing device 20, 1200 and/or a mobile computing device that communicates with the dispensing device 20, 1200 can provide reminders to the user to take medications according to a medication schedule that is either stored in the memory of the dispensing device 20, 1200 or remotely therefrom. The mobile computing device or the dispensing device 20, 1200 may generate an audible signal at a predetermined time (e.g., corresponding to a reminder to take a particular mediation). The dispensing device 20, 1200 may dispense medication corresponding to the audible signal. The mobile computing device may run according to instructions stored therein to operate and may contain an application that communicates with the dispensing device 20, 1200, e.g., so if the user dismisses a reminder on either the dispensing device 20, 1200 or the mobile computing device, the alert also stops on the other. The drug regimen reminders can also be output by the mobile computing device based on the dosage schedule information that the device knows from scanning the bottle label, written prescription from the pharmacy, etc. The user of the dispensing device can opt-in to receiving notifications or reminders that are generated by the dispensing device and communicated to the mobile computing device associated with the user. In an example embodiment, the user's mobile computing device is authorized by interaction with the PBM or insurance computing system, which can authorize use of the dispensing device and gathering information from the dispensing device. The alerts can also include feedback about missed doses. The alerts and/or reminders may be animated or include a jingle or otherwise provide positive feedback to provide positive reinforcement to the user. In some embodiments, a reward system may be tied to medication adherence.

Figure 17B:
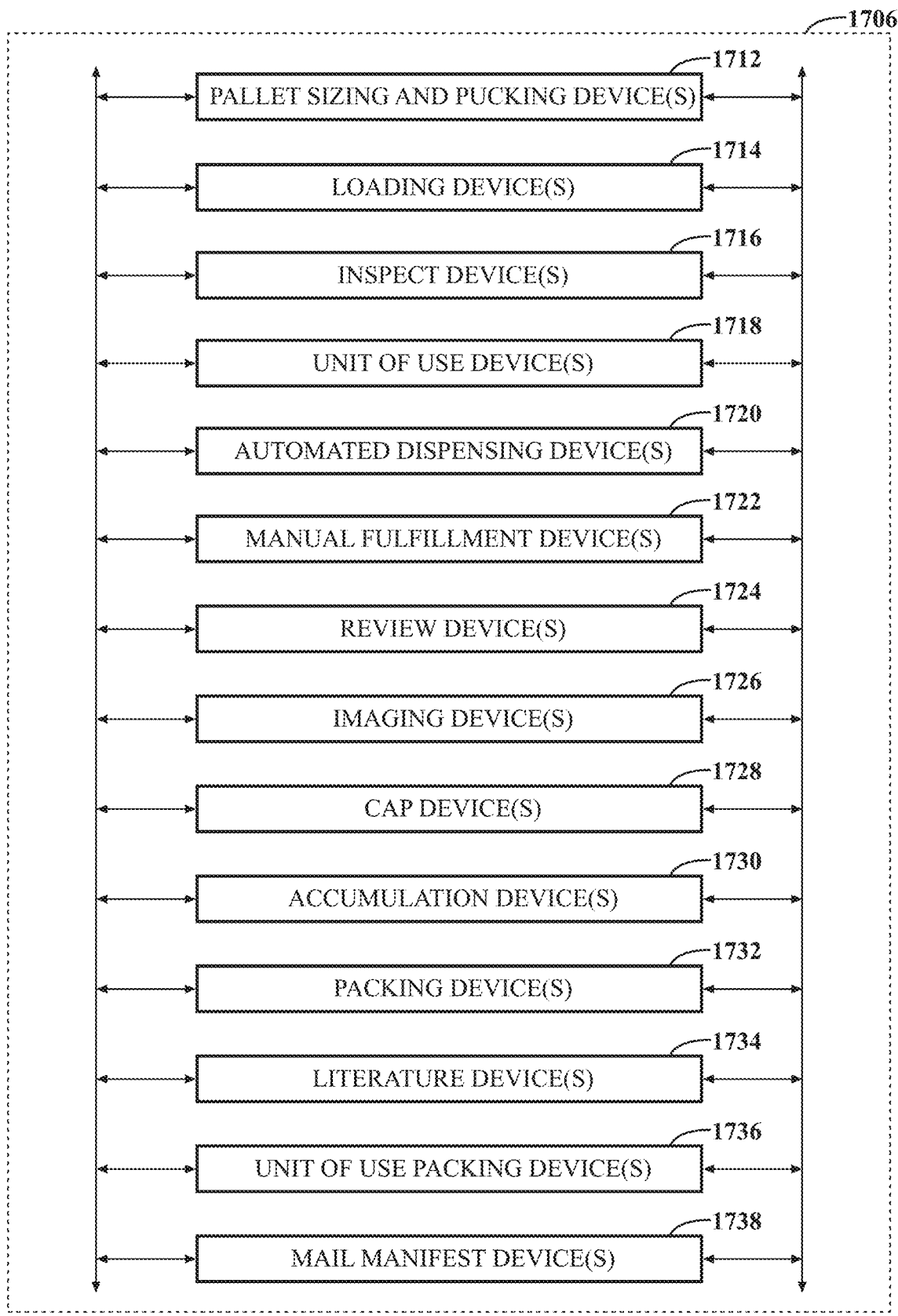
FIG. 17B is a schematic view showing a pharmacy that may be the pharmacy in FIG. 17A.

FIG. 17B generally illustrates the pharmacy 1706 according to the principles of an embodiment of the present disclosure. The pharmacy 1706 may be used to process and fulfill prescriptions and prescription orders. After fulfillment, the fulfilled prescriptions are packed for shipping. The dispensing device 20 may be used with other pharmacy systems and the like.

The pharmacy 1706 may include devices in communication with the pharmacy benefit manager 1708, an order processing device, and/or the storage device, directly or over the network. Specifically, the pharmacy 1706 may include pallet sizing and pucking device(s) 1712, loading device(s) 1714, inspect device(s) 1716, unit of use device(s) 1718, automated dispensing device(s) 1720, manual fulfillment device(s) 1722 (which may be fulfill environmentally controlled drugs), review devices 1724, imaging device(s) 1726, cap device(s) 1728, accumulation devices 1730, packing device(s) 1732, literature device(s) 1734, unit of use packing device(s) 1736 (which may be pack environmentally controlled drugs), and mail manifest device(s) 1738. Further, the pharmacy 1706 may include additional devices, which may communicate with each other directly or over the network.

In some embodiments, operations performed by one of these devices 1712-1738 may be performed sequentially, or in parallel with the operations of another device as may be coordinated by the order processing device, which may include a dedicated processor in operable communication with a memory. In some embodiments, the order-processing device tracks a prescription with the pharmacy based on operations performed by one or more of the devices 1712-1738.

In some embodiments, the pharmacy may transport prescription drug containers, for example, among the devices 1712-1738 in the high-volume fulfillment center, by use of pallets. The pallet sizing and pucking device 1712 may configure pucks in a pallet. A pallet may be a transport structure for a number of prescription containers, and may include a number of cavities. A puck may be placed in one or more than one of the cavities in a pallet by the pallet sizing and pucking device 1712. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device based on prescriptions that the order processing device decides to launch. The arrangement logic may be implemented directly in the pallet sizing and pucking device 1712. Once a prescription is set to be launched, a puck suitable for the appropriate size of container for that prescription may be positioned in a pallet by a robotic arm or pickers. The pallet sizing and pucking device 1712 may launch a pallet once pucks have been configured in the pallet.

The loading device 1714 may load prescription containers into the pucks on a pallet by a robotic arm, a pick and place mechanism (also referred to as pickers), etc. In various embodiments, the loading device 1714 has robotic arms or pickers to grasp a prescription container and move it to and from a pallet or a puck. The loading device 1714 may also print a label that is appropriate for a container that is to be loaded onto the pallet, and apply the label to the container. The pallet may be located on a conveyor assembly during these operations (e.g., at the high-volume fulfillment center, etc.).

The inspect device 1716 may verify that containers in a pallet are correctly labeled and in the correct spot on the pallet. The inspect device 1716 may scan the label on one or more containers on the pallet. Labels of containers may be scanned or imaged in full or in part by the inspect device 1716. Such imaging may occur after the container has been lifted out of corresponding puck by a robotic arm, picker, etc., or may be otherwise scanned or imaged while retained in the puck. In some embodiments, images and/or video captured by the inspect device 910 may be stored in the storage device as order data.

The unit of use device 1718 may temporarily store, monitor, label, and/or dispense unit of use products. In general, unit of use products are prescription drug products that may be delivered to a user or member without being repackaged at the pharmacy 1706. These products may include pills in a container, pills in a blister pack, inhalers, temperature-controlled drugs, etc. Prescription drug products dispensed by the unit of use device 1718 may be packaged individually or collectively for shipping, or may be shipped in combination with other prescription drugs dispensed by other devices in the high-volume fulfillment center.

At least some of the operations of the devices 1712-1738 may be directed by the order processing device. For example, the manual fulfillment device 1722, the review device 1724, the automated dispensing device 1720, and/or the packing device 1732, etc. may receive instructions provided by the order processing device.

The automated dispensing device 1720 may include one or more devices that dispense prescription drugs or pharmaceuticals into prescription containers in accordance with one or multiple prescription orders. In general, the automated dispensing device 1720 may include mechanical and electronic components with, in some embodiments, software and/or logic to facilitate pharmaceutical dispensing that would otherwise be performed in a manual fashion by a pharmacist and/or pharmacist technician. For example, the automated dispensing device 1720 may include high-volume fillers that fill a number of prescription drug types at a rapid rate and blister pack machines that dispense and pack drugs into a blister pack. Prescription drugs dispensed by the automated dispensing devices 1720 may be packaged individually or collectively for shipping, or may be shipped in combination with other prescription drugs dispensed by other devices in the high-volume fulfillment center.

The manual fulfillment device 1722 controls how prescriptions are manually fulfilled. For example, the manual fulfillment device 1722 may receive or obtain a container and enable fulfillment of the container by a pharmacist or pharmacy technician. In some embodiments, the manual fulfillment device 1722 provides the filled container to another device in the pharmacy fulfillment devices to be joined with other containers in a prescription order for a user or member. For example, non-environmentally controlled drugs and environmentally controlled drugs may be filled and joined together for packaging.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. or retrieve drugs from a cooler. Some portions of the manual fulfillment process may be automated by use of a machine. For example, counting of capsules, tablets, or pills may be at least partially automated (such as through use of a pill counter). Prescription drugs dispensed by the manual fulfillment device 1722 may be packaged individually or collectively for shipping, or may be shipped in combination with other prescription drugs dispensed by other devices in the high-volume fulfillment center.

The review device 1724 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 1724 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review may be performed at a manual review station.

The imaging device 1726 may image containers once they have been filled with pharmaceuticals. The imaging device 1726 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon.

A temperature controlled package may be imaged to ensure the correct coolant is in the package. The images may be transmitted to the order processing device and/or stored in the storage device as part of the order data.

The cap device 1728 may be used to cap or otherwise seal a prescription container. In some embodiments, the cap device 1728 may secure a prescription container with a type of cap in accordance with a user preference (e.g., a preference regarding child resistance, etc.), a plan sponsor preference, a prescriber preference, etc. The cap device 1728 may also etch a message into the cap, although this process may be performed by a subsequent device in the high-volume fulfillment center.

The accumulation device 1730 accumulates various containers of prescription drugs in a prescription order. The accumulation device 1730 may accumulate prescription containers from various devices or areas of the pharmacy. For example, the accumulation device 924 may accumulate prescription containers from the unit of use device 1718, the automated dispensing device 1720, the manual fulfillment device 1722, and the review device 1724. The accumulation device 1730 may be used to group the prescription containers prior to shipment to the member.

The literature device 1734 prints, or otherwise generates, literature to include with each prescription drug order. The literature may be printed on multiple sheets of substrates, such as paper, coated paper, printable polymers, or combinations of the above substrates. The literature printed by the literature device 1734 may include information required to accompany the prescription drugs included in a prescription order, other information related to prescription drugs in the order, financial information associated with the order (for example, an invoice or an account statement), etc.

In some embodiments, the literature device 1734 folds or otherwise prepares the literature for inclusion with a prescription drug order (e.g., in a shipping container). In other embodiments, the literature device 1734 prints the literature and is separate from another device that prepares the printed literature for inclusion with a prescription order.

The packing device 1732 packages the prescription order in preparation for shipping the order. The packing device 1732 may box, bag, or otherwise package the fulfilled prescription order for delivery. The packing device 1732 may further place inserts (e.g., literature or other papers, etc.) into the packaging received from the literature device 1734. For example, bulk prescription orders may be shipped in a box, while other prescription orders may be shipped in a bag, which may be a wrap seal bag.

The packing device 1732 may label the box or bag with an address and a recipient's name. The label may be printed and affixed to the bag or box, be printed directly onto the bag or box, or otherwise associated with the bag or box. The packing device 1732 may sort the box or bag for mailing in an efficient manner (e.g., sort by delivery address, etc.). The packing device 1732 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise to a delivery location. Some packages will be delivered using autonomous delivery vehicles, e.g., ground vehicles or aircraft, to the delivery location.

The unit of use packing device 1736 packages a unit of use prescription order in preparation for shipping the order. The unit of use packing device 1736 may include manual scanning of containers to be bagged for shipping to verify each container in the order. In an example implementation, the manual scanning may be performed at a manual scanning station. A mail manifest device 1738 may print mailing labels used by the packing device 1732 and may print shipping manifests and packing lists.

Multiple devices may share processing and/or memory resources. The devices 1712-1738 may be located in the same area or in different locations. For example, the devices 1712-1738 may be located in a building or set of adjoining buildings. The devices 1712-1738 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 18:
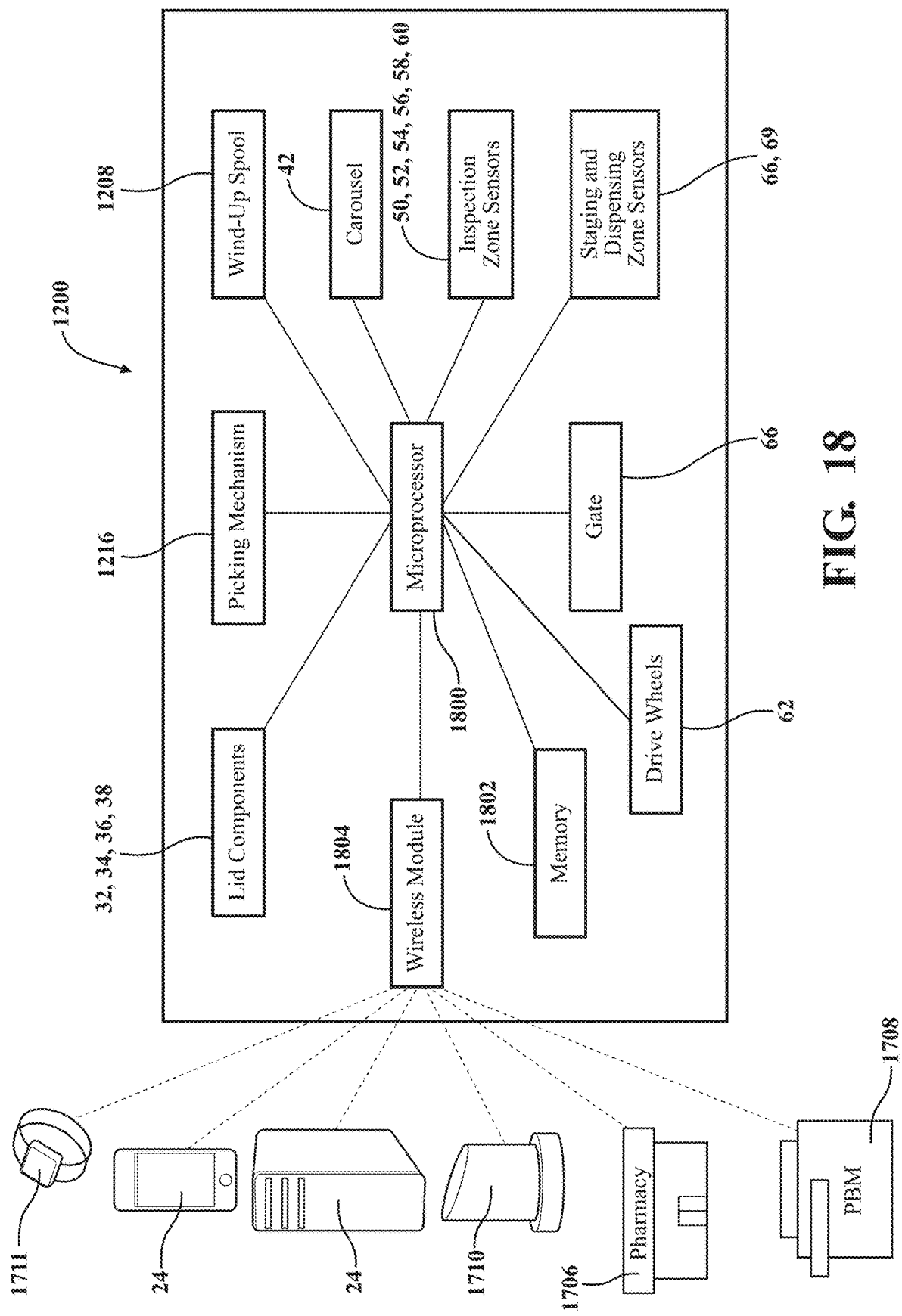
FIG. 18 is a schematic view of the electrical system of the dispensing device.

In FIG. 18, the electrical system of the dispensing device 1200 is schematically illustrated. As shown, the dispensing device 1200 includes a microprocessor 1800 (e.g., which may be referred to herein as the processor 1800), which is in electrical communication with a memory 1802 so that the processor 1800 can read from and write to the memory 1802. The processor 1800 may include any suitable processor, such as those described herein. Additionally, or alternatively, the dispensing device 1200 may include any suitable number of processors in addition to the processor 1800. The memory 1802 may comprise a single disk or a plurality of disks (e.g., hard drives), and includes a storage management module that manages one or more partitions within the memory 1802. In some embodiments, memory 1802 may include flash memory, semiconductor (solid state) memory or the like. The memory 1802 may include Random Access Memory (RAM), a Read-Only Memory (ROM), or a combination thereof. The memory 1802 is preferably of the non-volatile type such that the data stored thereon is not lost in the event of a power failure in the dispensing device 20, 1200. The memory 1802 may include instructions that, when executed by the processor 1800, cause the processor 1800 to, at least, control various aspects the dispensing device 100.

The memory 1802 contains data which includes: (1) which medications are contained in the dispensing device 1200, e.g., in the bottles 40 on the carousel 42, in the plastic pouches 1202, and in the pill cups 1204, (2) the medication counts for each of these medications, (3) an automatic dispensing schedule (which can be adjusted by the user, the pharmacy 1706, or the pharmacy benefit manager 1708), (4) a log containing time stamps of all dispensing events, (5) an updateable database of predictive models to be accessed when confirming the contents of a container 40, 1202, 1204, and (6) additional health data related to the user (for example, data uploaded to the dispensing device 1200 from a wearable device 1711, such as a smart watch or a glucose monitor). The dispensing device 1200 is preferably powered by alternating current (AC) from a wall outlet as its primary power source but contains a battery backup so that operation continues in the event of a loss of power from the primary power source. The dispensing device 20, 1200 further includes a wireless module 1804, which allows the dispensing device 1200 to connect with the internet router 1702 and/or external device 24.

The predictive models can be built and maintained outside of the dispensing device 20, e.g., in pharmacy systems or medical systems, and can be refreshed periodically using stored data. The dispensing device 20 includes an inspection zone to produce inputs to the prediction model. The inputs can include a label image, at least one bar codes, scan codes, multiple photo and sonographic images of contents, and net weight.

The dispensing device 20, 1200 is also preferably provided with a security system, which must be cleared prior to dispensing one or more types of pills 22 contained therein. The security system relies on a positive identification of the user through one or more of a personal identification number (PIN), thumbprint, facial recognition, a mobile phone app, a card reader, a Universal Serial Bus (USB) token, a Rivest-Shamir-Adleman (RSA) token, etc. The security system can also utilize on one or more sensors in a user's mobile device, such as the external device 24, to establish the positive identification. That is, before a medication is dispensed, the dispensing device 20, 1200 can communicate with the external device 24 which, in turn, will require the user to verify the user's identity through, for example, a fingerprint sensor or a facial identification sensor built into the external device 24.

The dispensing device 20, 1200 may also contain medications for multiple users, e.g., different members of a family. In use, the dispensing device 20, 1200 may validate which user is interacting with the dispensing device 20, 1200 through a number of different means. For example, in some embodiments, the security system of the dispensing device 20, 1200 can validate which user is interacting with the dispensing device 20, 1200 using a positive identification means. In other embodiments, the user can be validated by the selecting a user profile and entering a passcode or password on the first display screen 36 or through a positive voice identification through either the microphone 34 or through the voice assistant 1810.

In some embodiments, the dispensing device 20, 1200 may include one or more sensors configured to measure or sense various aspects of the dispensing device 20, 1200 and/or an environment external to the dispensing device 20, 1200. For example, the dispensing device 20, 1200, may include a motion sensor, or other suitable sensor, configured to detect motion proximate to the dispensing device 20, 1200. The processor 1800 may receive data from the sensor and may illuminate a light associated with the dispensing tray 28 in response to the detected motion.

In some embodiments, the dispensing device 20, 1200 may include one or more vital measurement devices. For example, the dispensing device 20, 1200 may include a pulse monitor, a blood pressure cuff (e.g., of other suitable blood pressure measuring device), a thermometer (e.g. a touchless thermometer or other suitable thermometer), other suitable vital measurement devices, or a combination thereof. The user may interact with the one or more vital measurement devices. For example, the user may use a pulse monitor to measure the user's pulse. The processor 1800 may receive a pulse measurement from the pulse monitor indicating the user's pulse. The processor 1800 may store the pulse measurement in user measurements table or database (herein after referred to as the user measurement data). The user measurements data may be stored on the memory 1802, on a cloud computing device, on a mobile computing device of the user, or other suitable location. For example, the processor 1800 may store and/or update the user measurements data in the memory 1802. Additionally, or alternatively, the processor 1800 may communicate with a suitable cloud computing device, remotely located server, mobile computing device, or other suitable remotely located computing device to store and/or update the user measurements data.

In some embodiments, the user may interact with a blood pressure measuring device of the dispensing device 20, 1200. The user may use the blood pressure measuring device to measure a blood pressure of the user. The processor 1800 may receive a blood pressure measurement from the blood pressure measuring device indicating the blood pressure of the user. The processor 1800 may update the user measurements data to include the blood pressure measurement.

In some embodiments, the user may interact with a thermometer of the dispensing device 20, 1200. The user may use the thermometer to measure a temperature of the user. The processor 1800 may receive a temperature measurement from the thermometer indicating the user's temperature. The processor 1800 may update the user measurement data to include the temperature measurement. It should be understood that the dispensing device 20, 1200 may include any suitable measuring device that the user may interact with to provide measurement data corresponding to the user.

In some embodiments, the user may interact with a keyboard, touch screen, or other suitable input device to provide various measurements (e.g., pulse measurement, blood pressure measurement, temperature measurement, insulin measurement, other suitable measurements, or a combination thereof). For example, the user may interact with a touch screen on the dispensing device 20, 1200 to provide various measurements to the dispensing device 20, 1200. In some embodiments, the user may interact with an application on a corresponding mobile computing device. The user may provide user measurement data using the application. The application may communicate the user measurement data, using the mobile computing device, to the dispensing device 20, 1200. The processor 1800 may store and/or update the user measurement data, based on the received various measurements.

In some embodiments, the processor 1800 may be configured to communicate the user measurement data to a pharmacist and/or medical provider. The pharmacists and/or medical provider may review the user measurement data and determine whether to adjust one or more medication doses taken by the user. The pharmacist and/or medical provider may, using a suitable computing device, communicate an adjusted medication dose to the dispensing device 20, 1200. The dispensing device 20, 1200 may adjust a dispensing amount for the medication based on the adjusted dose for the medication.

In some embodiments, the dispensing device 20, 1200 may be configured to communicate with other devices on the same network or within a range of the dispensing device 20, 1200. As described, the dispensing device 20, 1200 may include the wireless module 1804. The wireless module 1804 may include any suitable wireless communications device include a wireless fidelity (WiFI) communications device, a Bluetooth device, a near field communications device, any other suitable wireless communications device, or a combination thereof. The wireless module 1804 may communicate with a network, such as a Local Area Network, a Wide Area Network, the Internet, and/or other suitable networks. The wireless module 1804 may communicate with the network via the router 1702.

In some embodiments, the processor 1800, using the wireless module 1804, may identify other devices on the network. For example, the processor 1800 may identify devices on the network operating according to the same communications protocol. The other device may include Internet of Things (IoT) enabled devices, such as a coffee maker, a refrigerator, a smart switch, a smart light, an alarm clock, other suitable devices, or a combination thereof. The processor 1800 may identify behavioral patterns of the user based on communications with the other devices on the network. For example, the user may start a coffee maker, open a refrigerator, turn on one or more lights, turn off an alarm clock, and the like.

The processor 1800 may adjust a dispensing schedule of medications in the dispensing device 20, 1200 based on an identified behavioral pattern. For example, the dispensing device 20, 1200 may dispense medications in the dispensing device 20, 1200 to the dispensing tray 28 at a time that corresponds to the user being within a range of the dispensing device 20, 1200. The processor 1800 may identify the time that corresponds to the using being within the range of the dispensing device 20, 1200 based on the identified behavioral pattern.

In some embodiments, the processor 1800 may determine whether various medications dispensed by the dispensing device 20, 1200 and consumed by the user have adverse effects on the user. For example, the processor 1800 identify a sudden change in the behavioral pattern of the user and determine that one or more medications may be contributing to the change in behavioral patterns. For example, the processor 1800 may be in communication with a machine learning mechanism configured to identify behavioral changes corresponding to potential side effects of certain medications. The processor 1800 may generate an indication (e.g. such as a message or other suitable indication) indicating that the user may be experience side effects from one or more medications. The processor 1800 may communicate, using the route 1702, the indication to pharmacist and/or medical provider. The pharmacist and/or medical provider may contact the user and/or may adjust one or more doses of medications being consumed by the user.

In some embodiments, the dispensing device 20, 1200 may dispense a multiple day supply of medications in response to a request by the user. For example, the user may provide an input to the dispensing device 20, 1200 using any suitable input. For example, the demand may be input to the dispensing device 20, 1200 by a physical interaction by the user with the touch screen, by an interaction between the user and the external device, by an audible demand by the user that is sensed by the microphone of the dispensing device 20, 1200, or by a user's thought that is captured by a device implanted in or otherwise in communication with the user's brain.

The user may also demand a quantity of pills for a time period that the user will be away from the dispensing device 20, 1200, e.g., before the user goes on vacation, on a work trip, in the hospital, or any other suitable reason. For example, the user may be taking a trip and will not be near the dispensing device 20, 1200 for the period. The user may provide the dispensing device 20, 1200 with a number of days that the user will be away from the dispensing device 20, 1200. The processor 1800 may receiving the number of days and determine a quantity of each of the various medications taken by the user for the number of days. The processor 1800 may dispense the quantity of each of the various medications.

In some embodiments, the processor 1800 may dispense a single day supply of medication into the plastic pouches 1202, as described. In some embodiment, the processor 1800 may communicate with a pharmacist and/or medical provider indicating that the user has requested the multiple day supply of medication. The pharmacist and/or medical provider may determine whether to allow the dispensing device 20, 1200 to dispense the multiple day supply. The processor 1800 may receive an indication from the pharmacists and/or medical providing instructing the dispensing device 20, 1200 to dispense the multiple day supply. In response to the processor 1800 receiving instructions from the pharmacist and/or medical provider indicating not to dispense the multiple day supply, the processor 1800 may provide to the user (e.g., via the touch screen, communication via the mobile device, or any suitable mechanism), indicating to the user to contact the pharmacist and/or medical provider.

In some embodiments, the processor 1800 may be configured to communicate with a calendaring application associated with the user. For example, the user may utilize a calendaring application on the mobile device or any suitable computing device. The processor 1800 may identify travel plans stored in the calendaring application indicating that the user may be away from the dispensing device 20, 1200 for a period. The processor 1800 may generate a request to a pharmacist and/or medical provider indicating that the user may be away from the dispensing device 20, 1200. The request may request that the pharmacist and/or medical provider contact the user. In some embodiments, the processor 1800 may dispense a multiple day supply in response to identifying travel plans in the user's calendaring application.

In some embodiments, the processor 1800 may identify scheduled events in the calendaring application. For example, the processor 1800 may identify scheduled events that begin prior to a normal dispensing time. The processor 1800 may determine to dispense the mediations to the dispensing tray 28 prior to the identified scheduled event (e.g. such that the user does not leave the proximity of the dispensing device 20, 1200 prior to the mediations being dispensed).

In some embodiments, the processor 1800 may be configured to verify the identity of the user. The processor 1800 may be configured to receive various biometric data of the user, such as a facial scan, retina scan, fingerprints, and the like. For example, the processor 1800 may receive or retrieve a file that contains the facial recognition data and compare it to the image data captured by an image capturing device. The image capturing device may include a camera be disposed on the dispensing device 20, 1200, a camera associated with the mobile device, or any other suitable image capturing device. The processor 1800 may compare the facial recognition data with the image data using facial recognition software. The processor 1800 may verify the user's identify in response to a determination that the facial recognition data matches the image data.

In some embodiments, the dispensing device 20, 1200 may include a microphone or other suitable audible input device. The user may provide an audible input (e.g. by speaking, providing a tone generated by an application associated with the pharmacy 1706 on the mobile device, or other suitable audible input). The processor 1800 may compare the audible input to a corresponding stored file (e.g., a similar audible input, such as a sample of the speech of the user, a corresponding tone, or other suitable audible data or other suitable data). The processor 1800 may verify the identity of the user based on a determination that the audible input matches the corresponding file.

In some embodiments, the processor 1800 may receive one or more fingerprints scans of the user, using the fingerprint input device associated with the dispensing device 20, 1200, a fingerprint input device associated with the mobile device, or other suitable fingerprint input device. The processor 1800 may verify the identity of the user by comparing the fingerprint scans with stored fingerprints associated with the user. In some embodiments, the processor 1800 may scan one or more retinas of the recipient. For example, the processor 1800 may receive one or more retina scans from a retina scanner disposed on the dispensing device 20, 1200, a retina scanner associated with the mobile device, or any other suitable retina scanner or retina scanning device. The processor 1800 may compare the one or more retina scans with stored retina scans corresponding to the user. The processor 1800 may verify the identity of the user in response to a determination that the received retina scans match the stored retina scans corresponding to the user.

In some embodiments, the dispensing device 20, 1200 may be configured to scan a quick response (QR) code or barcode of the associated with the user. For example, the user may receive a QR code or a barcode from the pharmacy application, an SMS message, a text message, an email, a phone call, or other suitable QR code source. The user may print the QR code or barcode or the user may present the QR code or the barcode on the mobile device.

The processor 1800 may scan, using an image capturing device disposed on the dispensing device 20, 1200, the QR code or the barcode. The processor 1800 may compare the scanned QR code and/or barcode to QR code and/or barcode stored on the memory 1802 or other suitable location. The QR code and/or barcode stored on the memory 1802 or other suitable location may be generated by the processor 1800. For example, the processor 1800 may generate the QR code and/or barcode stored on the memory 1802 or other suitable location and the QR code and/or barcode received by the user. In some embodiments, the processor 1800 may receive the QR code and/or barcode from the pharmacy application. The processor 1800 may verify the identify of the user in response to the QR code and/or barcode presented by the user matching the QR code and/or barcode stored on the memory 1802 or other suitable location.

In some embodiments, the processor 1800 may receive a numeric value from the user (e.g., via a keypad input, a touch screen, or other suitable input device, such as those described herein). For example, the user may receive a numeric value from the via the pharmacy application. The user may provide or input the numeric value to the dispensing device 20, 1200. The processor 1800 may verify the identity of the user based on a comparison of the numeric value to a numeric value communicated to the processor 1800 by via the pharmacy application. It should be understood that the processor 1800 may receive any other suitable information from the user in addition to or instead of those described herein that the processor 1800 may user to verify the identity of the user.

In some embodiments, the processor 1800 may be configured to perform the methods described herein. In some embodiments, the processor 1800 may communicate with various other devices, such as mobile computing devices, networks, cloud computing devices, remotely located servers, and the like to perform the methods described herein.

Figure 19:
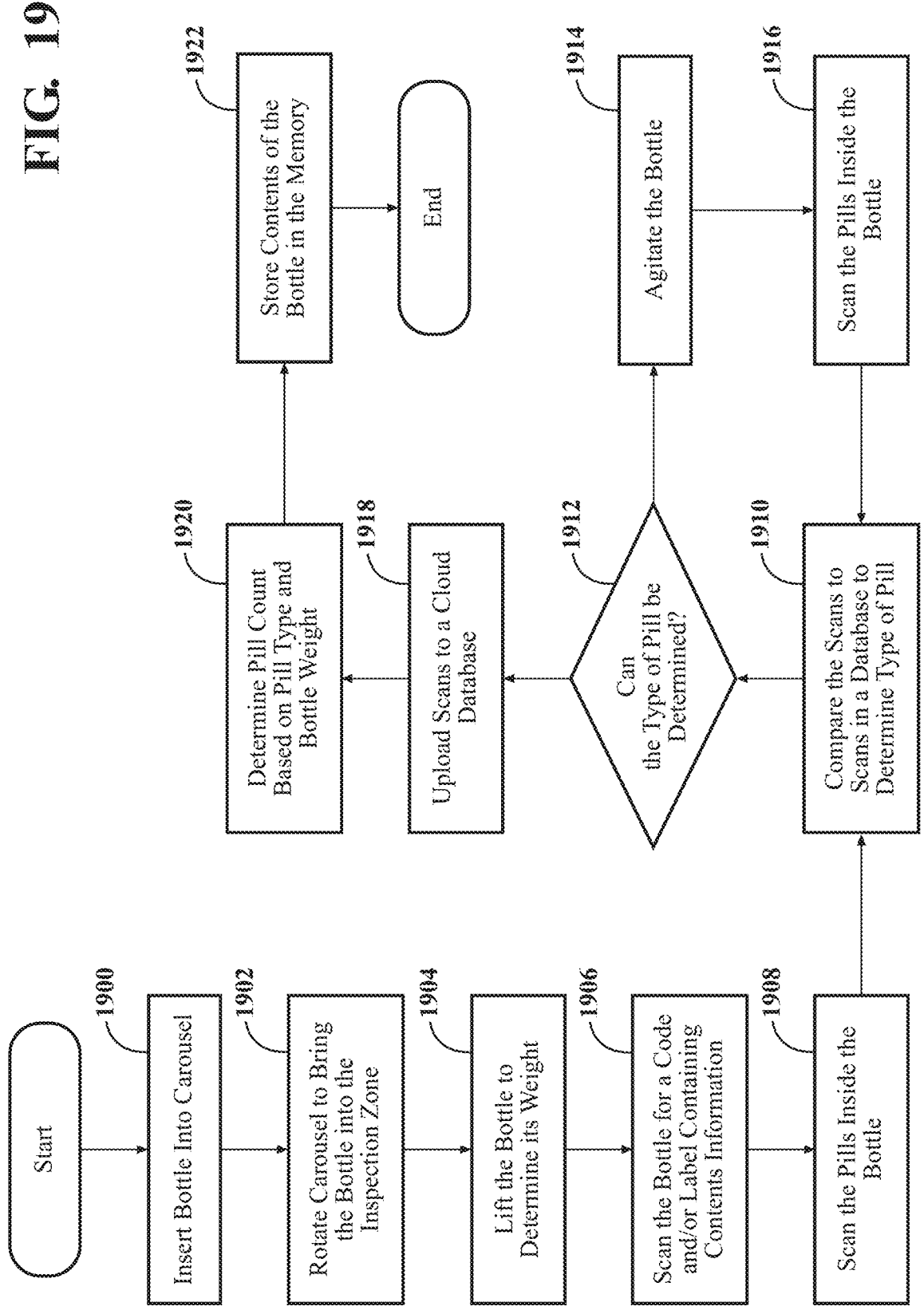
FIG. 19 is a flow chart illustrating the steps of an exemplary method according to one aspect of the subject disclosure.

Referring now to FIG. 19, a flow chart illustrates an exemplary method of inserting a bottle 40 into the dispensing device 20, 1200 and automatically determining and verifying the contents of the bottle 40. At step 1900, the bottle 40 is manually inserted into the carousel 42 in an upside-down orientation with the cap 44 being received within one of the openings of the carousel 42. At step 1902, the carousel 42 is automatically rotated to bring the bottle 40 into the inspection zone 46. At step 1904, the bottle 40 is lifted by the agitator 60 and the total weight of the bottle 40 and the pills 22 contained therein is measured. At step 1906, the outer surface of the bottle 40 is scanned for a code and/or label identifying the contents of the bottle 40. At step 1908, the cameras 68 and ultrasound sensor 58 are activated to scan the pills 22 inside the bottle 40. At step 1910, the results of the scanning (i.e., the photographs captured by the cameras and the sonogram generated by the ultrasound sensor) are compared against the database to determine the type of pill 22 in the bottle 40. At decision step 1912, the dispensing device 20, 1200 decides if it is able to determine the type of pills 22 in the bottle 40 based on the results of the scanning of the outer surface of the bottle 40 and of the pills 22 located in the bottle 40.

If the answer to decision step 1912 is no, then at step 1914, the agitator 60 is activated to shake up the contents of the bottle 40, and at step 2016, the cameras 50 and ultrasound sensor 58 are re-activated to scan the pills 22 inside the bottle 40 before proceeding back to step 1910. If the loop of steps 1910-1916 is repeated a predetermined number of times (e.g., five) and the type of pill 22 still cannot be determined, then the bottle 40 is rejected by the dispensing device 20, 1200 and an alert is given to the user, e.g., an audible alert is broadcast through the speaker 32 or a visual alert is displayed on the first or second display screens 36, 38 or on the user's external device 24.

If the answer to decision step 1912 is yes, then at step 1918, the scans (photographs and sonogram) are uploaded to the artificial intelligence cloud database to improve the future verification process for not just the user's dispensing device 20, 1200 but also for other users' dispensing devices. At step 1920, the pill count is verified based on a calculation which includes the weight measurement of the bottle 40 during step 1904, a known pill weight (from the database), and a known empty bottle weight (from the database). At step 1922, the dispensing device 20 stores data pertaining to the contents of the bottle 40, including both the type of medication and the pill count, in the memory 1802.

Referring now to FIG. 20, a flow chart depicting an exemplary method of dispensing one or more pills 22 from a bottle 40 in the dispensing device 20, 1200 is shown. At step 2000, the dispensing device 20, 1200 receives an instruction to dispense one or more pills 22 from one of the bottles 40 in the carousel 42 of the dispensing device 20, 1200. The instructions could be an on-demand request for a pill 22 from a user or they could be according to a predetermined schedule. At step 2002, the security system verifies a user's identity using a verification process, such as one of the verification processes discussed above. At step 2004, the carousel 42 is rotated to bring the bottle 40 containing the requested pill(s) 22 into the dispensing zone 48. At step 2006, the drive wheel 62 is activated to rotate the bottle 40 such that one or more pills 22 are dispensed through the cap 44 and into the staging zone 64 of the dispensing device 20, 1200. At step 2008, the pill(s) 22 are validated using the camera 68 in the staging zone 64. At decision step 2010, it is determined if the pills(s) 22 match the requested pills 22. If the answer to decision step 2010 is yes, then at step 2012, the gate 66 is opened to release the pill(s) 22 to the dispensing tray 28. If the answer to decision step 2010 is no, then at step 2014, the pill(s) 22 is/are rejected by the dispensing device 20, 1200, and an alert is provided to the user, e.g., an audible alert through the speaker 32 or a visual alert on the first or second display screens 36, 38 or on the user's external device 24.

Referring now to FIG. 21, a flow chart depicting an exemplary method of dispensing one or more pills 22 from a pill cup 1204 in the dispensing device 1200 is shown. At step 2100, the dispensing device 1200 receives an instruction to dispense the contents of one of the pill cups 1204 inside the dispensing device 1200. The instructions could be an on-demand request for a pill 22 from a user or they could be according to a predetermined schedule.

At step 2102, the security system verifies a user's identity using a verification process, such as one of the verification processes discussed above. At step 2104, the picking mechanism 1216 is actuated to engage and lift the pill cup 1204 out of the tray 1214.

At step 2106, the pills 22 are released into the staging zone 64. Step 2106 could involve, for example, dropping the full pill cup 1204 into the staging zone 64, cutting an opening into the pill cup 1204 to only drop the pills 22 into the staging zone 64, or removing a lid 1300 from the pill cup to only drop the pills 22 into the staging zone 64. The cutter could cut the top, bottom, or a side wall of the pill cup 1204 to release the pills 22. At step 2108, the pill(s) 22 are validated using the camera 68 in the staging zone 64. At decision step 2110, it is determined if the pills(s) 22 match the requested pills 22. If the answer to decision step 2110 is yes, then at step 2112, the gate 66 is opened to release the pill(s) 22 to the dispensing tray 28. If the answer to decision step 2110 is no, then at step 2114, the pill(s) 22 is/are rejected by the dispensing device 1200, and an alert is provided to the user, e.g., an audible alert through the speaker 32 or a visual alert on the first or second display screens 36, 38 or on the user's external device 24.

Referring now to FIG. 22, a flow chart depicting an exemplary method of dispensing one or more pills 22 from a plastic pouch 1202 in the dispensing device 1200 is shown. At step 2200, the dispensing device 1200 receives an instruction to dispense the contents of one of the plastic pouches 1202 inside the dispensing device 1200. The instructions could be an on-demand request for a pill 22 from a user or they could be according to a predetermined schedule. At step 2202, the security system verifies a user's identity using a verification process, such as one of the verification processes discussed above. At step 2204, the wind-up spool 1208 is activated to advance the requested plastic pouch 1202 until it is located directly over the staging zone 64. At step 2206, the cutting device 1210 is activated to cut an opening into the plastic pouch 1202 to drop the pills 22 into the staging zone 64. At step 2208, the pill(s) 22 are validated using the camera 68 in the staging zone 64. At decision step 2210, it is determined if the pills(s) 22 match the requested pills 22. If the answer to decision step 2210 is yes, then at step 2212, the gate 66 is opened to release the pill(s) 22 to the dispensing tray 28. If the answer to decision step 2210 is no, then at step 2314, the pill(s) 22 is/are rejected by the dispensing device 1200, and an alert is provided to the user, e.g., an audible alert through the speaker 32 or a visual alert on the first or second display screens 36, 38 or on the user's external device 24.

Referring back to FIG. 17A, the PBM device or the payor device can operate a predictive model to improve adherence of an individual user of the dispensing device based on data from a group of dispensing devices out in the field combined with data generated in the lab controlled by the payor or the PBM. The sensors in the dispensing devices can feed data back to a database. This data can train or validate a predictive model, which can be generated using machine learning. The predictive model can operate to predict and to validate the contents and count of items in the containers. All of the dispensing devices can provide feedback to further refine the predictive model. The predictive model can also operate on a medication type to determine if there are more adherence issues based on type of drug in conjunction with or separate from the type of user of the dispensing device. The ability of dispensing device to reproduce the exact conditions in the prediction environment (local) as were used in the training environment (remote), such as lighting and bottle positioning, will improve the accuracy of predictions in the predictive model.

The dispensing device may be configured to communicate directly with medical care providers (such as a doctor, a nurse, or a pharmacist) and/or allow the user to communicate with a medical care provider directly. The direct communication between the user and the medical care provider may be a telehealth appointment with audio and/or video displayed on the touch screen. This may allow the user to order and/or process a refill of a medication or order a new medication to be inserted into the dispensing device. The dispensing device may automatically schedule such a telehealth appointment based on any suitable factor, e.g., when the quantity of a medication in the dispensing device falls below a threshold. During the telehealth appointment, the dispensing device can provide data to the medical care provider. The data can include data from the user's wearable device(s), such as a smart watch or a glucose monitor, and/or information about any recently missed doses of medication. For example, using the actual device using its agitation functionality to agitate of the bottle contents in addition to taking multiple reads for prediction provides a low-cost method at model training time to automate the obtaining of multiple images (as many as needed by the training algorithm) with pills/contents rearranged after each agitation, to train predictive models.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

At least some example embodiments of the present disclosure can address human errors in adhering to the treatment regimen. This may reduce the occurrences of adverse events, e.g., overdoses, health danger, complications and possibly deaths, health danger and deaths due to It is believed that some tech-savvy patients have a decreased adherence to a drug treatment regimen. Some embodiments may assist the tech-savvy patients with their adherence.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A medication dispensing device for dispensing a medication from a bottle, the medication dispensing device comprising:
   a memory element;
   at least one sensor positioned inside the medication dispensing device, wherein the at least one sensor is configured to obtain inspection data associated with medication bottles including the bottle; and
   at least one processor communicatively coupled to the memory element and the at least one sensor, the at least one processor configured to:
      receive the bottle including a receptacle containing bottle contents and a cap assembly, wherein the bottle is disposed inside the medication dispensing device to position the cap assembly facing vertically downward, wherein the cap assembly includes an inner piece, a middle piece, and an outer piece, wherein the inner piece and the outer piece are fixed with one another, wherein the middle piece is fixed with the receptacle, and wherein each of the inner piece, the middle piece, and the outer piece of the cap assembly includes at least one medication opening;

perform an inspection of the bottle to verify a type and a quantity of the bottle contents, using the at least one sensor, wherein the medication comprises the bottle contents; and in response to verifying the type and the quantity of the bottle contents based on the inspection, dispense the medication, by:
  initiating rotation of the receptacle and the middle piece relative to the outer piece and the inner piece;
  based on the rotation, channeling a requested quantity of the bottle contents from the bottle sequentially through the at least one medication opening in the inner piece, then through the at least one medication opening in the middle piece, and then out of the cap assembly through the at least one medication opening in the outer piece; and
  releasing the requested quantity of the bottle contents to a dispensing tray of the medication dispensing device.

2. The medication dispensing device of claim 1, wherein the outer piece comprises an outer cap and the middle piece comprises an inner cap that is received in the outer cap, and wherein the inner piece comprises a disk that is received in the inner cap.

3. The medication dispensing device of claim 2, wherein the at least one medication opening in the disk is circumferentially offset from the at least one medication opening in the outer cap such that the medication must travel in the at least one medication opening in the inner cap around a rotational axis before exiting the cap assembly through the at least one medication opening in the outer cap.

4. The medication dispensing device of claim 1, wherein the at least one processor is further configured to:
  prior to releasing the requested quantity of the bottle contents to the dispensing tray,
  release the medication dispensed out of the cap assembly into a staging zone of the medication dispensing device, wherein the requested quantity comprises the medication dispensed out of the cap assembly;
  analyze the medication in the staging zone using a second sensor associated with the staging zone;
  perform a second verification of the medication in the staging zone; and
  dispense the medication out of the staging zone in response to a positive result of the second verification of the medication in the staging zone.

5. The medication dispensing device of claim 1, wherein the medication dispensing device further comprises a carousel disposed in an interior of a housing of the medication dispensing device;
  wherein the carousel includes a plurality of openings for receiving a plurality of cap assemblies including the cap assembly; and
  wherein the carousel is rotatable about a carousel axis parallel to a bottle axis to move a plurality of medication bottles through a plurality of zones within the interior of the housing, wherein the plurality of medication bottles includes the bottle.

6. The medication dispensing device of claim 5, wherein the at least one processor is further configured to:
  receive the bottle into a carousel of the medication dispensing device, wherein the bottle is disposed inside the carousel to position the cap assembly facing vertically downward;
  initiate rotation of the carousel to bring the bottle into an inspection zone inside the medication dispensing device, prior to rotating the receptacle and middle piece of the cap assembly; and
  perform the inspection of the bottle contents using the at least one sensor associated with the inspection zone.

7. The medication dispensing device of claim 1, further comprising a surface scanner communicatively coupled to the at least one processor, wherein the surface scanner is configured to scan an outer surface of the bottle for a label or machine-readable code identifying the bottle contents, wherein the surface scanner comprises at least one of: a code scanner and a label scanner; and
  wherein the at least one processor is further configured to perform the inspection by:
    initiating a first scan of a surface of the bottle using the surface scanner;
    initiating a second scan of the bottle contents using the at least one sensor, wherein the at least one sensor includes at least one of: a camera and an ultrasound sensor;
    performing a comparison of results of the second scan to a database of previous scans associated with the medication dispensing device and external medication dispensing devices; and
    verifying the type of the bottle contents based on the comparison.

8. The medication dispensing device of claim 7, wherein the at least one processor is further configured to:
  after to performing the comparison,
    determine whether the type of the bottle contents can be determined based on the first scan, the second scan, and the comparison; and
    when the type of the bottle contents can be determined, verify the type of the bottle contents.

9. The medication dispensing device of claim 7, further comprising an agitator communicatively coupled to the at least one processor, wherein the agitator is configured to lift the bottle and pivot the bottle about a pivot point;
  wherein the at least one processor is further configured to:
    after to performing the comparison,
      determine whether the type of the bottle contents can be determined based on the first scan, the second scan, and the comparison; and
      when the type of the bottle contents cannot be determined,
        activate the agitator to shake the bottle contents;
        initiate a third scan of the bottle contents using the at least one sensor;
        perform a second comparison of a second set of results of the third scan to the database of previous scans associated with the medication dispensing device and external medication dispensing devices; and
        verify the type of the bottle contents based on the second comparison.

10. The medication dispensing device of claim 1, further comprising an agitator communicatively coupled to the at least one processor, wherein the agitator is configured to lift the bottle and pivot the bottle about a pivot point, and wherein the agitator includes a built-in scale for measuring weight of the medication bottles;
  wherein the at least one processor is further configured to perform the inspection by:
    initiating lifting of the bottle using the agitator;
    determining a weight measurement of the bottle based on the lifting;
    performing a calculation using the weight measurement, known weights of a plurality of types of medications, and a known empty bottle weight associated with the bottle; and
    verifying the quantity of the bottle contents based on the calculation.

11. A method of dispensing a medication from a bottle in a medication dispensing device, the method comprising:
  receiving the bottle including a receptacle containing bottle contents and a cap assembly, by the medication dispensing device comprising at least one processor, a memory element, and at least one sensor, wherein the bottle is disposed inside the medication dispensing device to position the cap assembly facing vertically downward, wherein the cap assembly includes an inner piece, a middle piece, and an outer piece, wherein the inner piece and the outer piece are fixed with one another, wherein the middle piece is fixed with the receptacle, and wherein each of the inner piece, the middle piece, and the outer piece of the cap assembly includes at least one medication opening;
  performing an inspection of the bottle to verify a type and a quantity of the bottle contents, by the at least one processor using the at least one sensor inside the medication dispensing device, wherein the medication comprises the bottle contents; and
  in response to verifying the type and the quantity of the bottle contents based on the inspection, dispensing the medication, by:
    initiating rotation of the receptacle and the middle piece relative to the outer piece and the inner piece, by the at least one processor;
    based on the rotation, channeling a requested quantity of the bottle contents from the bottle sequentially through the at least one medication opening in the inner piece, then through the at least one medication opening in the middle piece, and then out of the cap assembly through the at least one medication opening in the outer piece; and
    releasing the requested quantity of the bottle contents to a dispensing tray of the medication dispensing device, by the at least one processor.

12. The method of claim 11, wherein the outer piece comprises an outer cap and the middle piece comprises an inner cap that is received in the outer cap, and wherein the inner piece comprises a disk that is received in the inner cap.

13. The method of claim 12, wherein the at least one medication opening in the disk is circumferentially offset from the at least one medication opening in the outer cap such that the medication must travel in the at least one medication opening in the inner cap around a rotational axis before exiting the cap assembly through the at least one medication opening in the outer cap.

14. The method of claim 11, further comprising:
  prior to releasing the requested quantity of the bottle contents to the dispensing tray,
    releasing the medication dispensed out of the cap assembly into a staging zone of the medication dispensing device, by the at least one processor, wherein the requested quantity comprises the medication dispensed out of the cap assembly;
    analyzing the medication in the staging zone using a second sensor associated with the staging zone, by the at least one processor;
    performing a second verification of the medication in the staging zone, by the at least one processor; and
    dispensing the medication out of the staging zone in response to a positive result of the second verification of the medication in the staging zone.

15. The method of claim 11, wherein the medication dispensing device further comprises a carousel disposed in an interior of a housing of the medication dispensing device;
  wherein the carousel includes a plurality of openings for receiving a plurality of cap assemblies including the cap assembly; and
  wherein the carousel is rotatable about a carousel axis parallel to a bottle axis to move a plurality of medication bottles through a plurality of zones within the interior of the housing, wherein the plurality of medication bottles includes the bottle.

16. The method of claim 15, wherein receiving the bottle further comprises receiving the bottle into a carousel of the medication dispensing device, wherein the bottle is disposed inside the carousel to position the cap assembly facing vertically downward; and
  wherein the method further comprises:
    initiating rotation of the carousel to bring the bottle into an inspection zone inside the medication dispensing device, prior to rotating the receptacle and middle piece of the cap assembly, by the at least one processor; and
    performing the inspection of the bottle contents using the at least one sensor associated with the inspection zone, by the at least one processor.

17. The method of claim 11, wherein performing the inspection further comprises:
  initiating a first scan of a surface of the bottle for a code or label identifying the bottle contents using at least one of: a code scanner and a label scanner, by the at least one processor;
  initiating a second scan of the bottle contents using the at least one sensor, by the at least one processor, wherein the at least one sensor includes at least one of: a camera and an ultrasound sensor;
  performing a comparison of results of the second scan to a database of previous scans associated with the medication dispensing device and external medication dispensing devices, by the at least one processor; and
  verifying the type of the bottle contents based on the comparison, by the at least one processor.

18. The method of claim 17, further comprising:
  after to performing the comparison,
    determining whether the type of the bottle contents can be determined based on the first scan, the second scan, and the comparison; and
    when the type of the bottle contents can be determined, verifying the type of the bottle contents.

19. The method of claim 17, further comprising:
  after to performing the comparison,
    determining whether the type of the bottle contents can be determined based on the first scan, the second scan, and the comparison; and
    when the type of the bottle contents cannot be determined,
      activating an agitator to shake the bottle contents, by the at least one processor;

initiating a third scan of the bottle contents using the at least one sensor, by the at least one processor;

performing a second comparison of a second set of results of the third scan to the database of previous scans associated with the medication dispensing device and external medication dispensing devices, by the at least one processor; and verifying the type of the bottle contents based on the second comparison, by the at least one processor.

20. The method of claim 11, wherein performing the inspection further comprises:

initiating lifting of the bottle using an agitator associated with a scale, by the at least one processor;

determining a weight measurement of the bottle based on the lifting, by the at least one processor;

performing a calculation using the weight measurement, known weights of a plurality of types of medications, and a known empty bottle weight associated with the bottle, by the at least one processor; and verifying the quantity of the bottle contents based on the calculation, by the at least one processor.

* * * * *